United States Patent
Hering et al.

(10) Patent No.: US 6,837,962 B2
(45) Date of Patent: Jan. 4, 2005

(54) METHODS AND APPARATUS FOR JOINING PIECES OF THERMOPLASTIC MATERIAL TO FORM CELLULAR BLOCKS

(75) Inventors: Gerhard K. Hering, Ransbach-Baumbach (DE); Dietmar Bersbach, Nümbrecht (DE)

(73) Assignee: VersaCore Industrial Corp., Kennett Square, PA (US)

(*) Notice: Subject to any disclaimer, the term of this patent is extended or adjusted under 35 U.S.C. 154(b) by 0 days.

(21) Appl. No.: 09/934,177

(22) Filed: Aug. 21, 2001

(65) Prior Publication Data

US 2002/0092603 A1 Jul. 18, 2002

Related U.S. Application Data

(63) Continuation-in-part of application No. PCT/DE00/00070, filed on Jan. 11, 2000.

(51) Int. Cl.[7] .............................................. B32B 31/20
(52) U.S. Cl. .................... 156/308.4; 156/197; 156/292; 156/469
(58) Field of Search ................ 156/197, 205, 156/292, 308.4, 469, 471

(56) References Cited

U.S. PATENT DOCUMENTS

| | | | |
|---|---|---|---|
| 2,821,616 A | 1/1958 | Spott | |
| 2,968,712 A | 1/1961 | Runkle | |
| 2,975,263 A | 3/1961 | Green et al. | |
| 3,007,834 A | 11/1961 | Moeller et al. | |
| 3,077,533 A | 2/1963 | Rohr et al. | |
| 3,162,765 A | 12/1964 | Cran | |
| 3,283,118 A | 11/1966 | Runkle | |
| RE26,287 E | 10/1967 | Wasilisin et al. | |
| 3,356,555 A | 12/1967 | Jackson | |
| 3,379,594 A | 4/1968 | Bruder | |

(List continued on next page.)

FOREIGN PATENT DOCUMENTS

| | | |
|---|---|---|
| CH | 684589 A5 | 10/1994 |
| DE | 1479016 B | 10/1962 |
| DE | 198 30 380 A1 | 1/2000 |
| DE | 199 16 842 A1 | 10/2000 |
| DE | 199 28 712 C1 | 11/2000 |
| EP | 0 336 722 A2 | 10/1989 |
| EP | 0531251 A2 | 3/1993 |
| GB | 2 188 166 A | 9/1987 |
| WO | WO 93/01048 A1 | 1/1993 |
| WO | WO 98/42604 A2 | 10/1998 |

OTHER PUBLICATIONS

U.S. patent application Ser. No. 10/193,661, filed Jul. 11, 2002; In re: Hering; entitled *Method and Device for Joining Sections of Thermoplastic Continuous Web Material.*

*Primary Examiner*—Blaine Copenheaver
*Assistant Examiner*—John L. Goff
(74) *Attorney, Agent, or Firm*—Alston & Bird LLP

(57) ABSTRACT

A carrying mechanism repeatedly obtains pieces of thermoplastic material from a supplying mechanism and provides them to a forming mechanism, where they are welded together to form a cellular block. In the forming mechanism, the piece to be added to the block and the piece most recently previously added to the block are arranged in opposing face-to-face relation, and then they are welded together by contemporaneously forming multiple spaced apart and elongate welds therebetween. The welding is performed by positioning heating elements between the piece to be added to the block and the piece most recently previously added to the block to heat laterally spaced apart strips of these pieces, withdrawing the heating elements, and at the same time rolling welding mechanisms along the strips so that the strips are nipped between the rolling welding mechanisms and other welding mechanisms.

2 Claims, 13 Drawing Sheets

U.S. PATENT DOCUMENTS

| | | |
|---|---|---|
| 3,675,522 A | 7/1972 | Hull |
| 4,174,987 A | 11/1979 | Belvin et al. |
| 4,921,744 A | 5/1990 | Mitsui et al. |
| 4,957,577 A | 9/1990 | Huebner |
| 4,992,132 A | 2/1991 | Schmidlin et al. |
| 5,039,567 A | 8/1991 | Landi et al. |
| 5,102,485 A | 4/1992 | Keeler et al. |
| 5,131,970 A | 7/1992 | Potter et al. |
| 5,139,596 A | 8/1992 | Fell |
| 5,217,556 A | 6/1993 | Fell |
| 5,252,163 A | 10/1993 | Fell |
| 5,277,732 A | 1/1994 | Meier |
| 5,296,280 A | 3/1994 | Lin et al. |
| 5,312,511 A | 5/1994 | Fell |
| 5,354,394 A | 10/1994 | Seebo et al. |
| 5,399,221 A | 3/1995 | Casella |
| 5,421,935 A | 6/1995 | Dixon et al. |
| 5,549,773 A | 8/1996 | Henderson et al. |
| 5,571,369 A | 11/1996 | Dixon et al. |
| 5,635,273 A | 6/1997 | Dixon et al. |
| 5,670,001 A | 9/1997 | Huebner et al. |
| 5,735,986 A | 4/1998 | Fell |
| 5,746,879 A | 5/1998 | Huebner et al. |
| 5,792,295 A | 8/1998 | Huebner et al. |
| 5,879,780 A | 3/1999 | Kindinger et al. |
| 5,897,730 A | 4/1999 | Huang |
| 5,935,376 A | 8/1999 | Fell |
| 6,146,484 A | 11/2000 | Alam et al. |

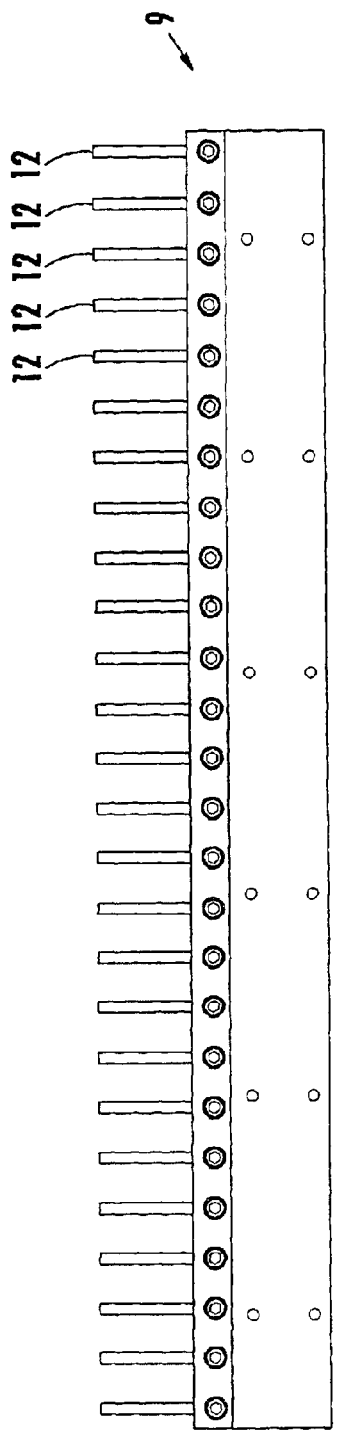
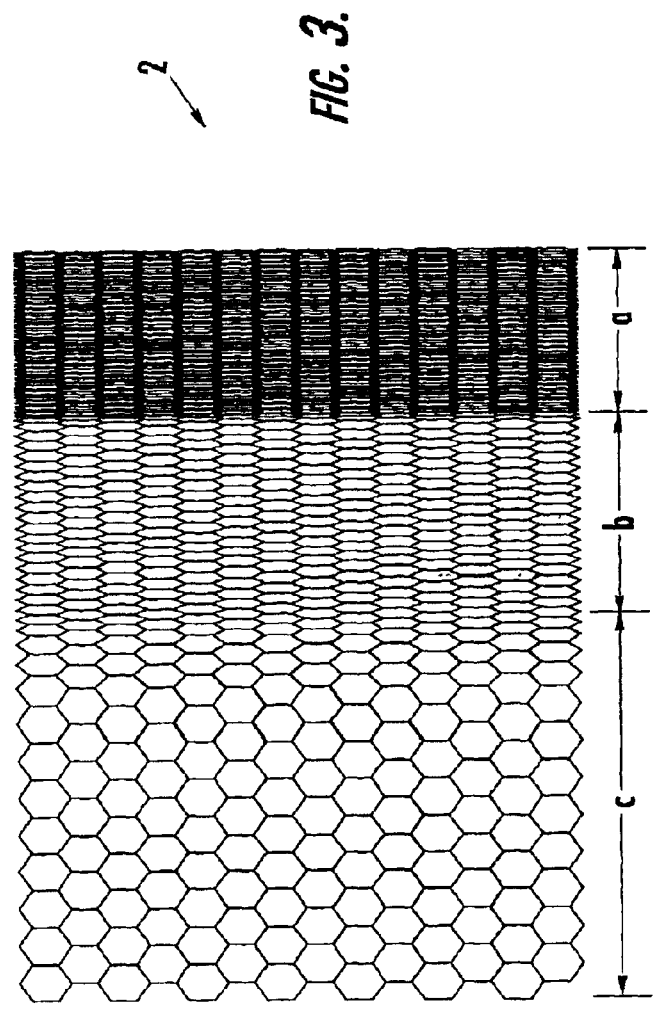
FIG. 2.
FIG. 3.

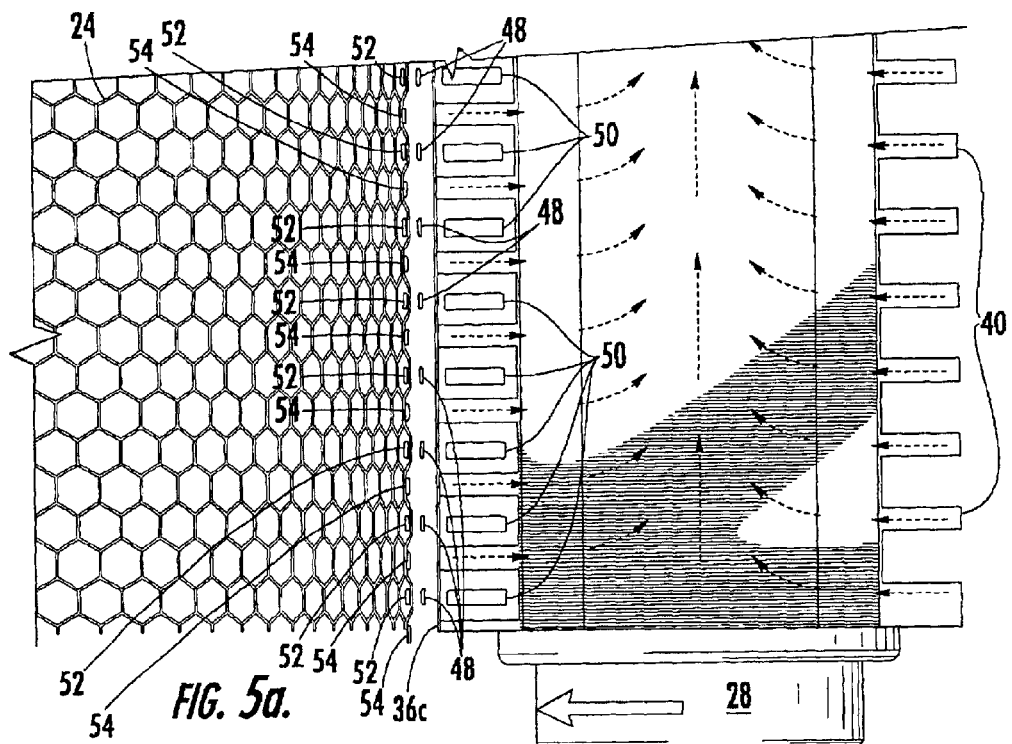
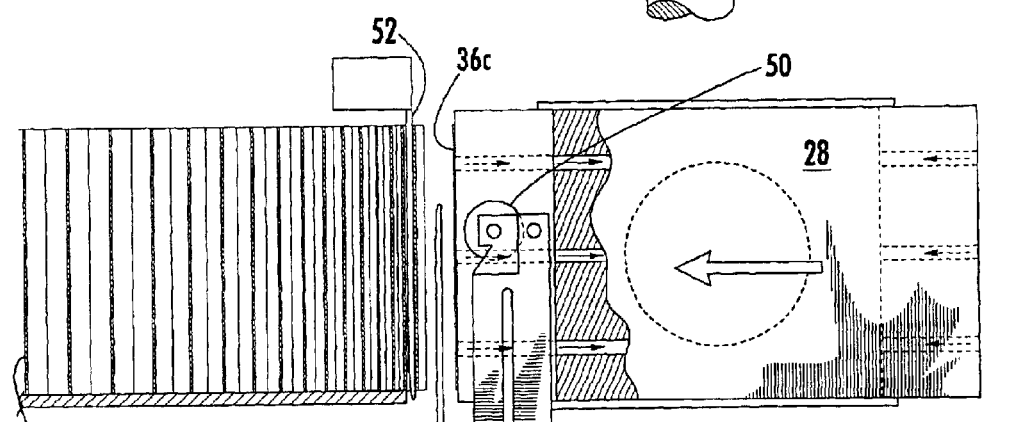
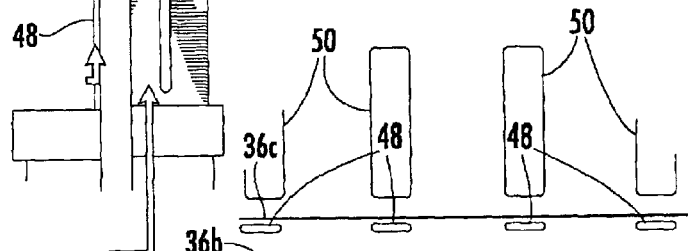

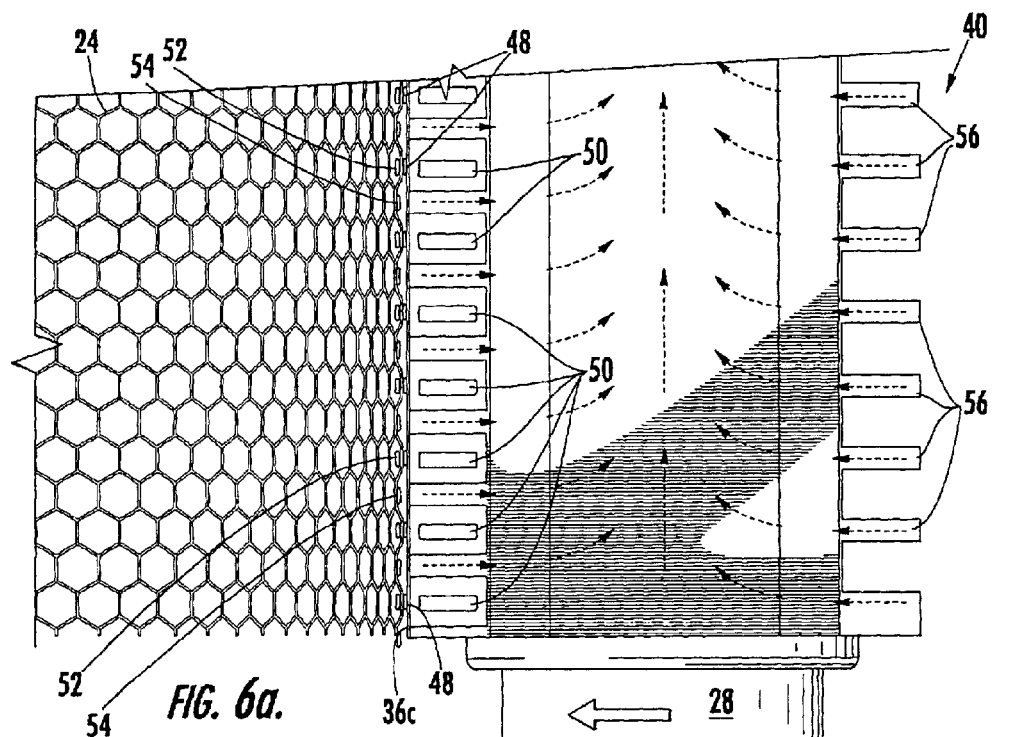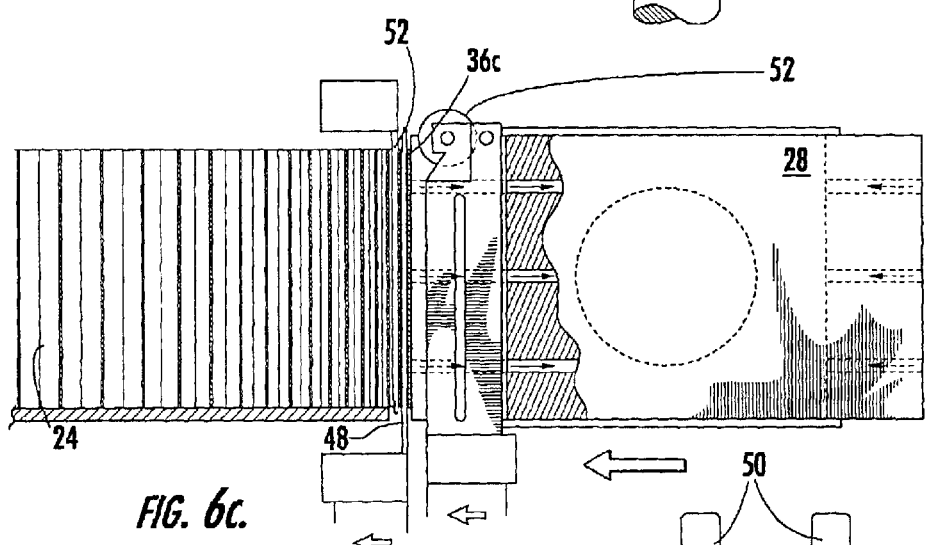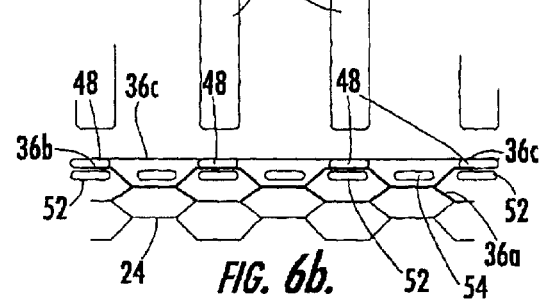

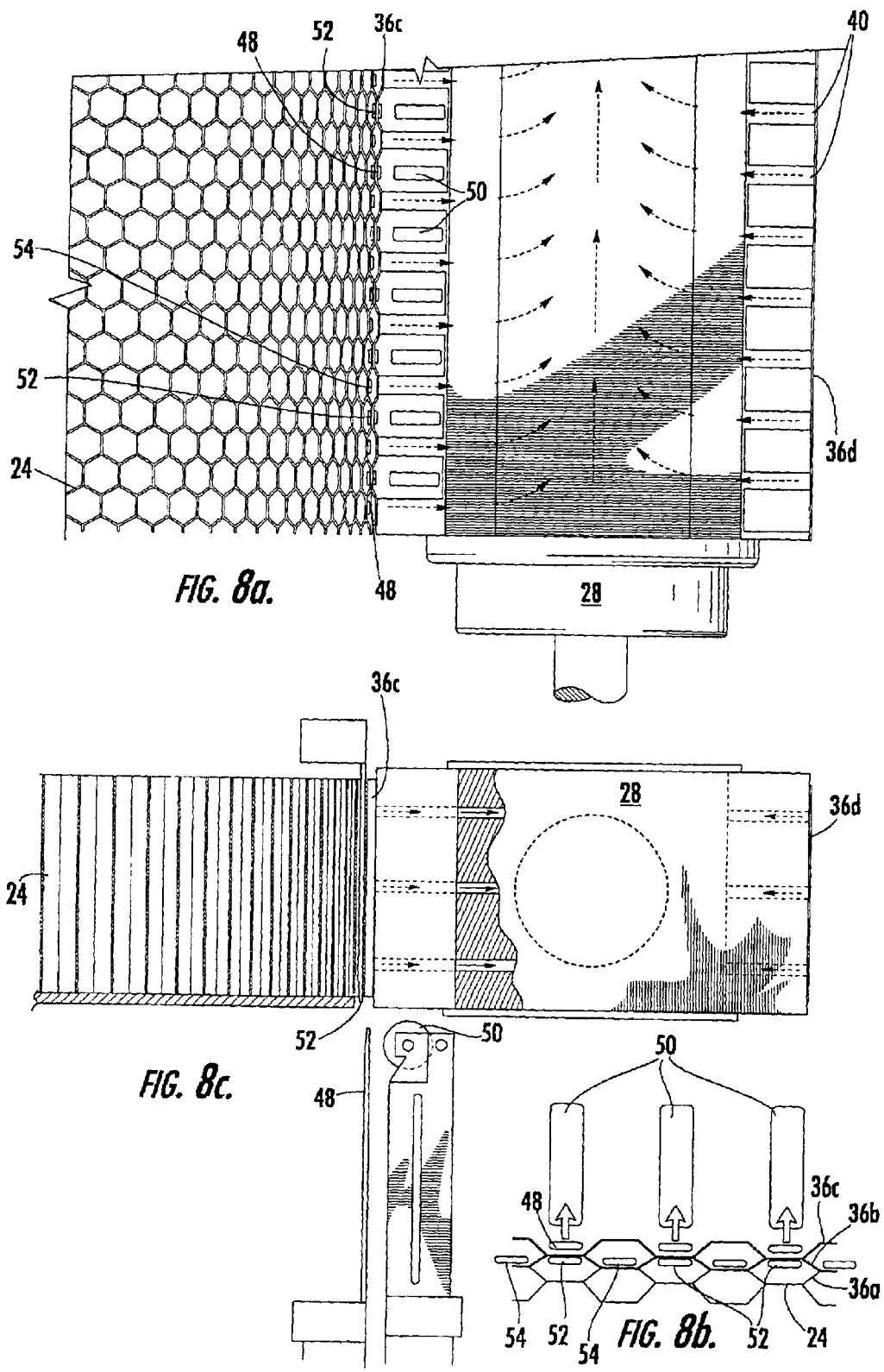

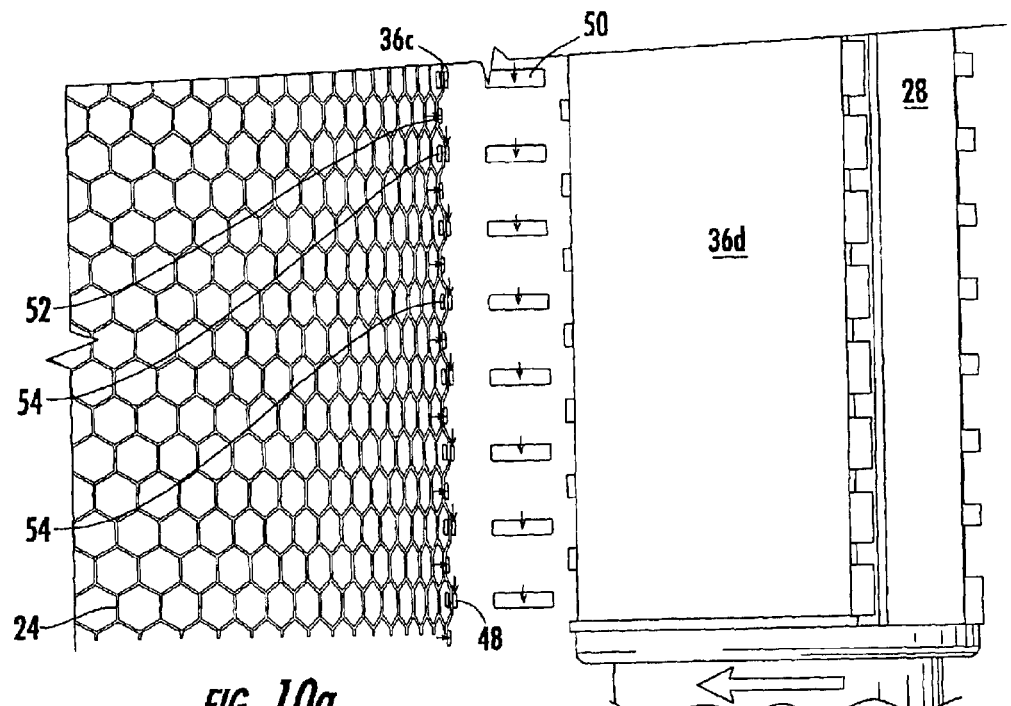
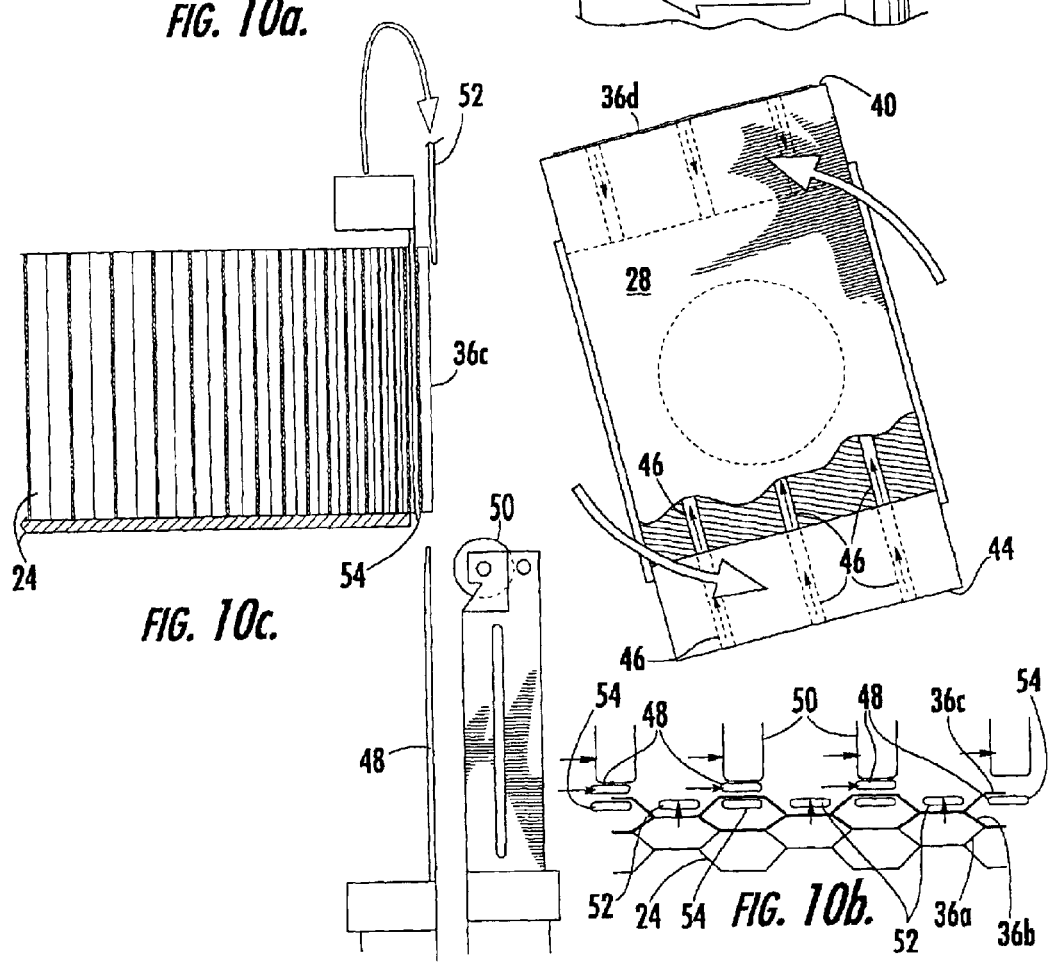
FIG. 10a.
FIG. 10c.
FIG. 10b.

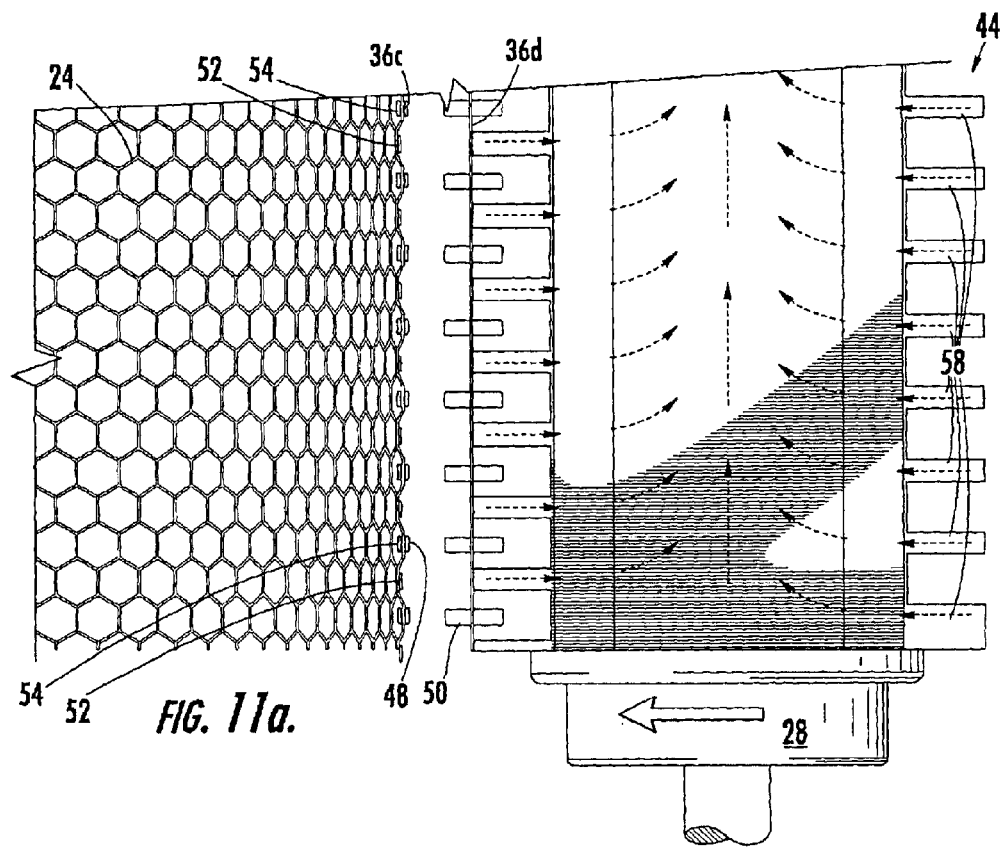
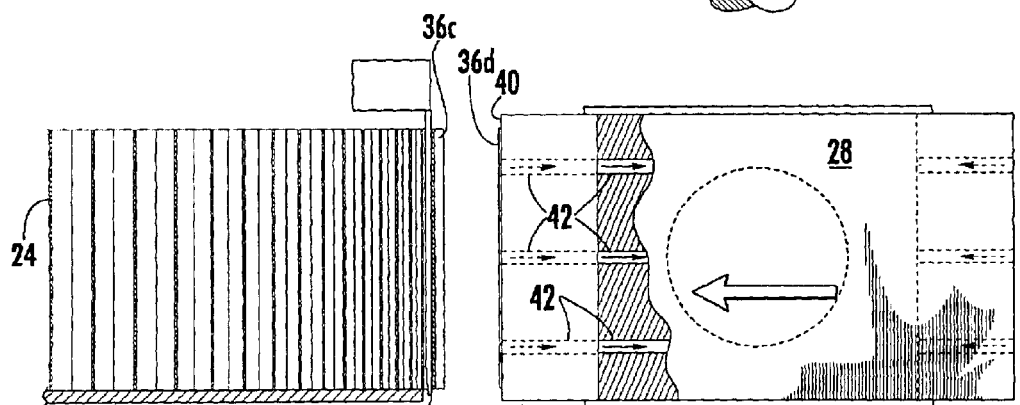
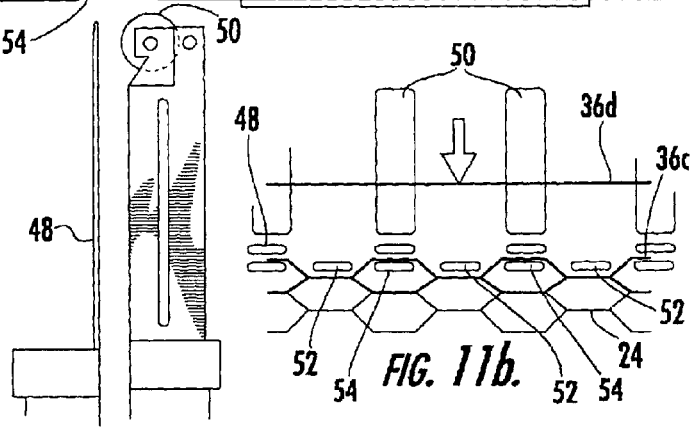
FIG. 11a.
FIG. 11c.
FIG. 11b.

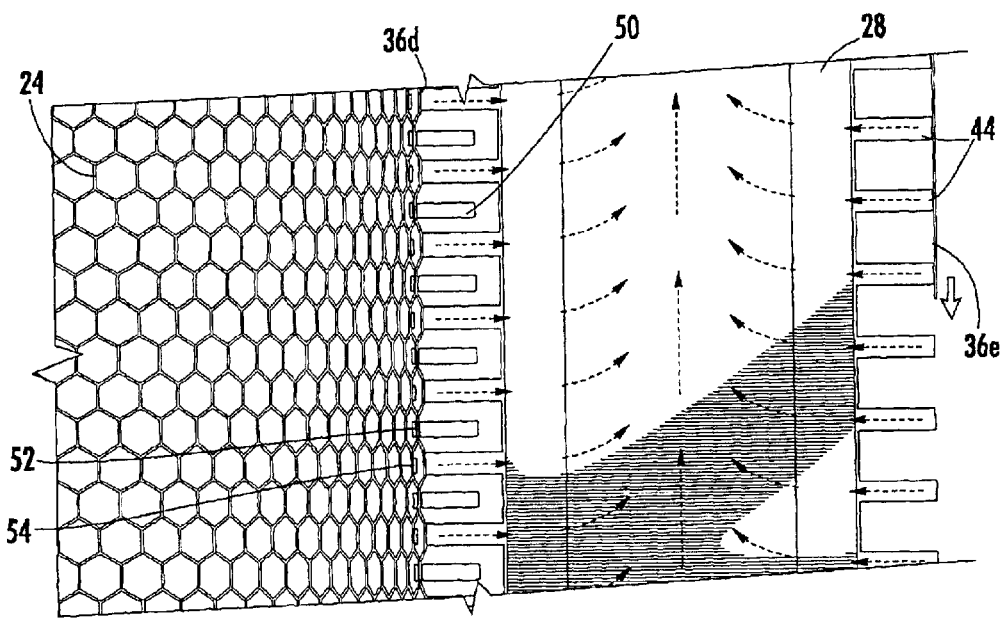
FIG. 12a.
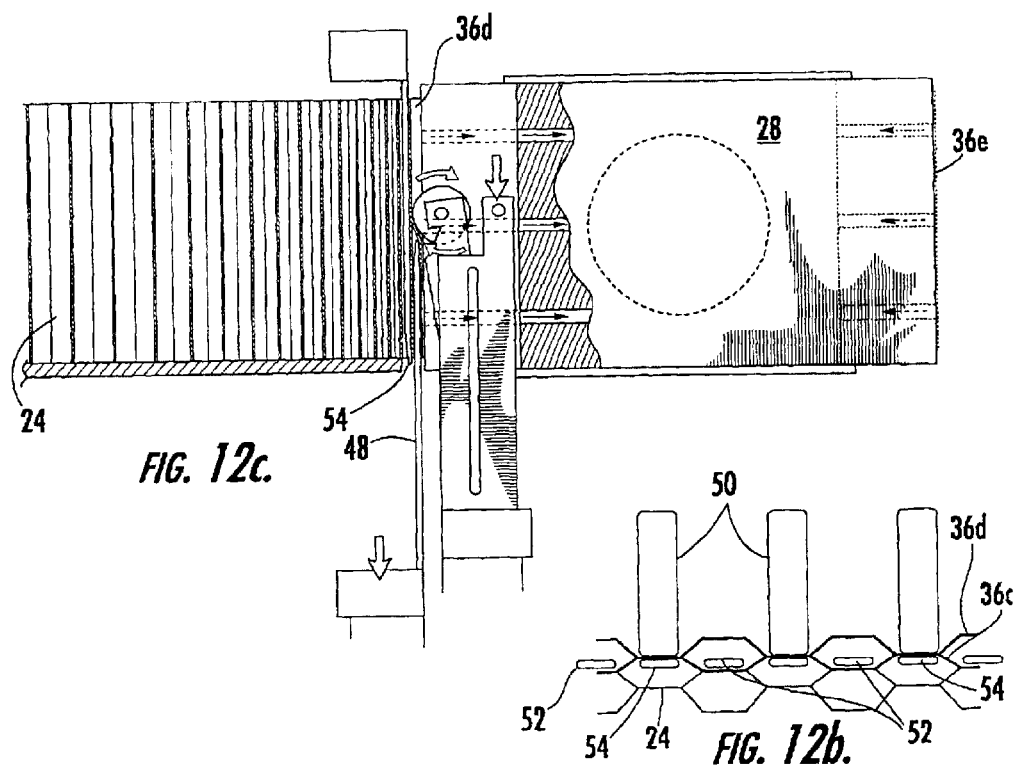
FIG. 12c.
FIG. 12b.

us 6,837,962 B2

METHODS AND APPARATUS FOR JOINING PIECES OF THERMOPLASTIC MATERIAL TO FORM CELLULAR BLOCKS

CROSS-REFERENCE TO RELATED APPLICATION

This is a continuation-in-part of International Application No. PCT/DE00/00070, filed Jan. 11, 2000, and designating the U.S., which is incorporated herein by reference.

FIELD OF THE INVENTION

The present invention pertains to converting sheets or strip-like pieces of material into cellular blocks and, more particularly, to welding cut pieces of thermoplastic material together to form an expandable cellular block, which can be expanded to form a honeycomb structure, or the like.

BACKGROUND OF THE INVENTION

It is known to form honeycomb structures, and the like, by thermally fusing (i.e., welding) cut pieces of thermoplastic material together to form an expandable cellular block, and then heating and pulling on the block to expand it and thereby convert it into a honeycomb structure. Although methods and apparatus are known for constructing honeycomb structures in this manner, it is desirable to improve the speed at which such honeycomb structures can be formed, and the quality of those honeycomb structures. For example, some prior methods and apparatus for forming honeycomb structures can be characterized as being too slow, or inefficiently requiring that the honeycomb structures be formed in batches, as opposed to via a continuous process. As another example of problems that can occur in the manufacture of a honeycomb structure, in some cases the welds between the pieces of thermoplastic material are not strong enough to withstand the pulling that is required to convert the expandable block into a honeycomb structure. The breakage of the welds negatively impacts the integrity of the final honeycomb structure.

In view of the foregoing, there is a need for improved methods and apparatus for forming expandable blocks and/or honeycomb structures.

SUMMARY OF THE INVENTION

In accordance with one aspect of the present invention, methods and apparatus are provided for solving the above and other problems by quickly and efficiently forming three-dimensional structures, namely cellular blocks and more specifically honeycomb structures, or the like. The cellular blocks are formed by thermally fusing (i.e., welding) together sheets or strip-like pieces of material, which are most preferably roll goods, especially thermoplastic nonwovens. In accordance with one aspect of the present invention, a formed cellular block is expandable, and the welds are sufficiently strong to remain intact while the expandable block is expanded to form a honeycomb structure, or the like.

In accordance with one aspect of the present invention, a carrying mechanism supplies multiple cut pieces of thermoplastic material that are joined to form the cellular block. The carrying mechanism includes at least one station, and the station repeatedly travels between supplying and forming mechanisms. The supplying mechanism sequentially supplies the cut pieces to the station of the carrying mechanism, the forming mechanism sequentially receives the cut pieces from the station of the carrying mechanism, and the forming mechanism sequentially welds those received cut pieces together to form the cellular block. The station includes multiple ports at which a partial vacuum is supplied to at least partially facilitate the carrying of the cut pieces by the station.

In accordance with one aspect of the present invention, first and second pieces of the thermoplastic material, which may or may not be cut pieces, are arranged in opposing face-to-face relation, and the first and second pieces are welded together by contemporaneously (i.e., at the same time) forming multiple spaced apart and elongate welds between the first and second pieces. The welding includes rolling a welding mechanism across at least one of the first and second pieces in a longitudinal direction so that each of the welds extends in the longitudinal direction. Preferably, the welds are spaced apart from one another in a lateral direction that is at least generally perpendicular to the longitudinal direction. Advantageously, the welding mechanism is a rolling mechanism that participates in defining nips for forming the welds by providing multiple rolling contact regions, and each nip is relatively small due to the rolling aspect of the rolling mechanism, so that considerable pressure can be applied at the nip to form a strong weld. The rolling mechanism is preferably in the form of multiple welding rollers that are spaced apart from one another in the lateral direction.

In accordance with one aspect of the present invention, at least one cut piece to be added to the cellular block is supplied to the cellular block by engaging a plurality of spaced apart protrusions to the cut piece, and moving the protrusions along a path so that the protrusions carry the cut piece along the path. Preferably this feature is incorporated into the station of the carrying mechanism, so that the station includes multiple protrusions for repeatedly engaging and carrying cut pieces to the forming mechanism. For the station, slots are defined between adjacent protrusions of the station and the welding rollers are respectively received in the slots.

In accordance with one aspect of the present invention, a cut piece to be welded to the cellular block is arranged in opposing face-to-face relation with a cut piece most recently previously welded to the cellular block, then these cut pieces are welded together by contemporaneously forming multiple spaced apart and elongate first welds therebetween. In preparation for this welding, the welding rollers and a plurality of heating elements are contemporaneously moved along opposite sides of, and in close proximity to, the cut piece to be welded to the cellular block, while the cut piece to be welded is being held by the station of the carrying mechanism in the opposing face-to-face relation with the cut piece most recently previously welded to the cellular block. The heating elements are spaced apart from one another in the lateral direction and respectively aligned with the welding rollers.

The welding more specifically includes using the heating elements to contemporaneously heat laterally spaced apart strips of each of the cut piece to be welded to the cellular block and the cut piece most recently previously welded to the cellular block, while withdrawing the heating elements from between these cut pieces. The heated and laterally spaced apart strips of the cut piece to be welded to the cellular block are aligned with the heated and laterally spaced apart strips of the cut piece most recently previously welded to the cellular block by virtue of their being respectively heated by the same heating elements, and these strips are respectively nipped together to form elongate and laterally spaced apart welds between these cut pieces. This nipping is preferably between the welding rollers and other welding structure. After the welds between these cut pieces are completely formed, the heating elements and welding rollers have been withdrawn from the cellular block, and thereafter the heating elements, welding rollers and carrying mechanism are together moved laterally, and then used with respect to the next cut piece being added to the cellular block. This coordinated lateral translating of the welding rollers, heating elements and carrying mechanism continues in a reciprocatory fashion, with welds being formed while the welding rollers, heating elements and carrying mechanism are in their first lateral position, then while they are in their second lateral position, then while they are in their first lateral position, and so on, to form the laterally offset welds of the celluar block.

In accordance with the immediately preceding aspect more specifically, the nipping alternately includes nipping cut pieces between the welding rollers (which can be characterized as a set of welding mechanisms) and a first set of welding mechanisms, then translating the welding rollers laterally and nipping cut pieces between the welding rollers and a second set of welding mechanisms, then translating the welding rollers laterally and nipping cut pieces between the welding rollers and the first set of welding mechanisms, and so on. In accordance with this aspect, the first and second welding mechanisms each preferably include multiple rod-like members that are laterally spaced apart. Generally described, the welding rollers alternately "roll along" the first and second sets of welding mechanisms, and each time the welding rollers are rolled they are welding a new cut piece to the cellular block. As a result, and for example, welding a first cut piece to the cellular block includes nipping between the welding rollers and the first set of welding mechanisms to contemporaneously form multiple spaced apart and elongate first welds between the first cut piece and a prior cut piece that was most recently previously welded to the cellular block, and the welding of a second cut piece to the cellular block occurs after the welding of the first cut piece to the cellular block and includes nipping between the welding rollers and the second set of welding mechanisms to contemporaneously form multiple spaced apart and elongate second welds between the first cut piece and the second cut piece, so that the second welds are laterally offset from the first welds. This adding of additional cut pieces by forming laterally offset welds continues repeatedly by alternately using the first and second sets of welding mechanisms, which are respectively moved to upstream of the upstream end of the cellular block after each use.

In accordance with one aspect of the present invention, the cellular block is formed in and flows in a generally horizontal direction, so as to advantageously minimize vertical constraints. In accordance with this aspect, the pieces being welded extend generally upright, the welds are formed so that they are elongate and extend generally upright while being formed, the carrying mechanism reciprocates generally horizontally between the supplying mechanism and the forming mechanism, and the cellular block is pulled generally horizontally to expand it and convert it into a honeycomb, or the like.

In accordance with one aspect of the present invention, multiple cut pieces of thermoplastic material are joined one after the other by positioning a cut piece being added to the cellular block parallel with each of the cut pieces of the cellular block; heating, to the welding temperature of the cut pieces, first strips which are opposite one another on surfaces of the cut piece being added to the cellular block and a cut piece most recently previously added to the cellular block; pressing together the surfaces of the cut piece being added to the cellular block and the cut piece most recently previously added to the cellular block, so that the first strips of the cut piece being added to the cellular block and the first strips of the cut piece most recently previously added to the cellular block respectively meet and thereby the cut piece being added to the cellular block and the cut piece most recently previously added to the cellular block are welded or thermally fused together and the cut piece being added to the cellular block becomes the cut piece most recently previously added to the cellular block; a cut piece being added to the cellular block is brought in a parallel position to the cut piece most recently previously added to the cellular block, whereby flat surfaces of the cut piece being added to the cellular block and the cut piece most recently previously added to the cellular block oppose each other; heating, to the welding temperature of the cut pieces, second strips which are opposite one another on the surfaces of the cut piece being added to the cellular block and the cut piece most recently previously added to the cellular block, wherein the second strips are spaced apart from the first strips by approximately double the width of the first and second strips; and pressing together the surfaces of the cut piece being added to the cellular block and the cut piece most recently previously added to the cellular block, so that the second strips of the cut piece being added to the cellular block and the second strips of the cut piece most recently previously added to the cellular block receptively meet and thereby the cut piece being added to the cellular block and the cut piece most recently previously added to the cellular block are welded or thermally fused together and the cut piece being added to the cellular block becomes the cut piece most recently previously added to the cellular block.

In accordance with one aspect of the present invention, an apparatus for joining multiple cut pieces of thermoplastic material to form a cellular block includes an open-ended magazine that receives the cellular block, and a carrying mechanism positioned in front of the magazine and including a plurality of stations that are distributed about the circumference of the carrying mechanism. In accordance with this aspect, each station includes a carrying mechanism for carrying a cut piece, a heating mechanism oriented towards the carrying mechanism and capable of being driven back and forth between a position in front of the carrying mechanism and a position which is pulled back from the carrying mechanism, and a pressure mechanism that operates in conjunction with the carrying mechanism and the heating mechanism for adding the cut piece to the cellular block.

BRIEF DESCRIPTION OF THE DRAWINGS

Figure 1:
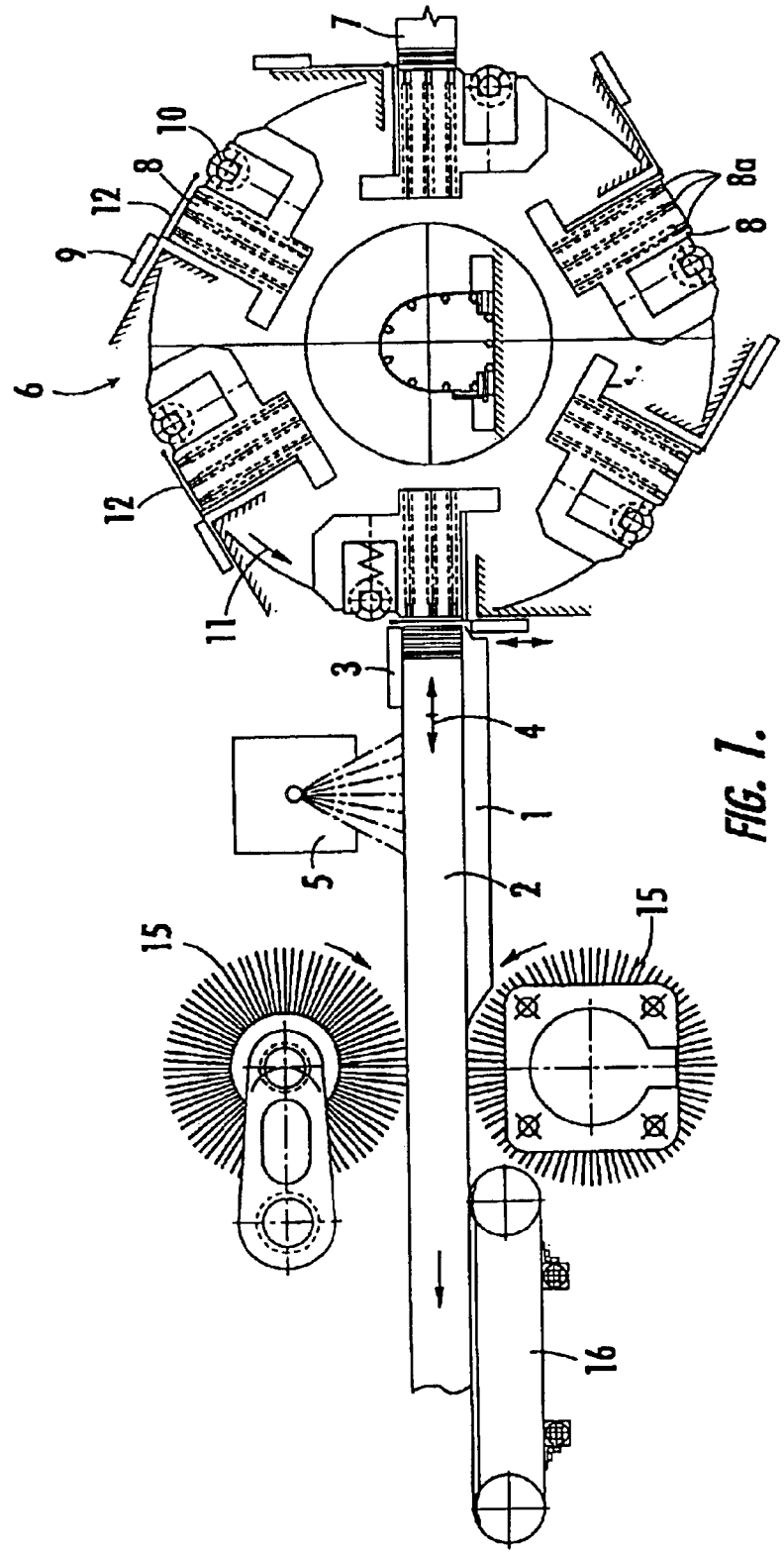
Figure 4:
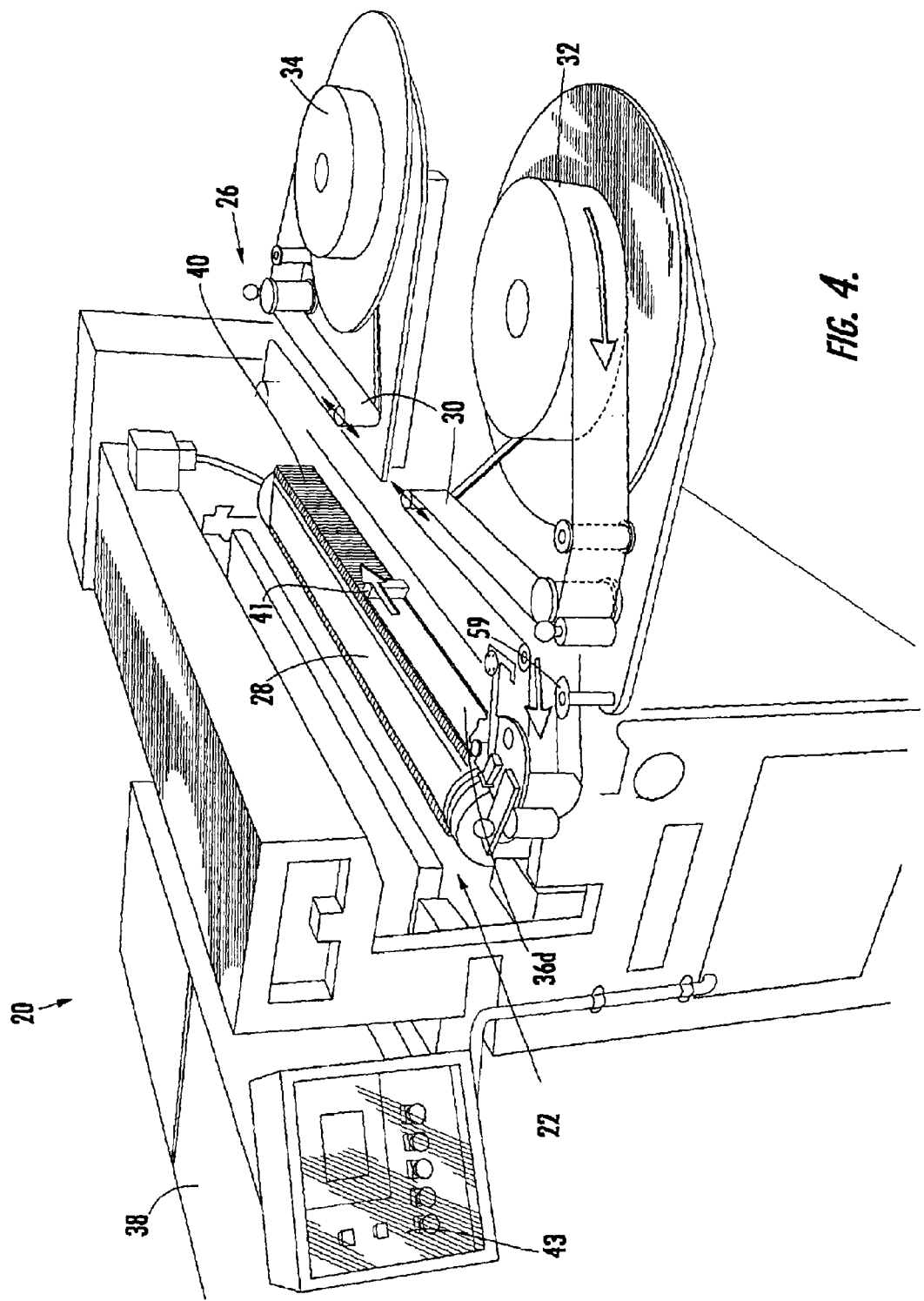
Figure 13:
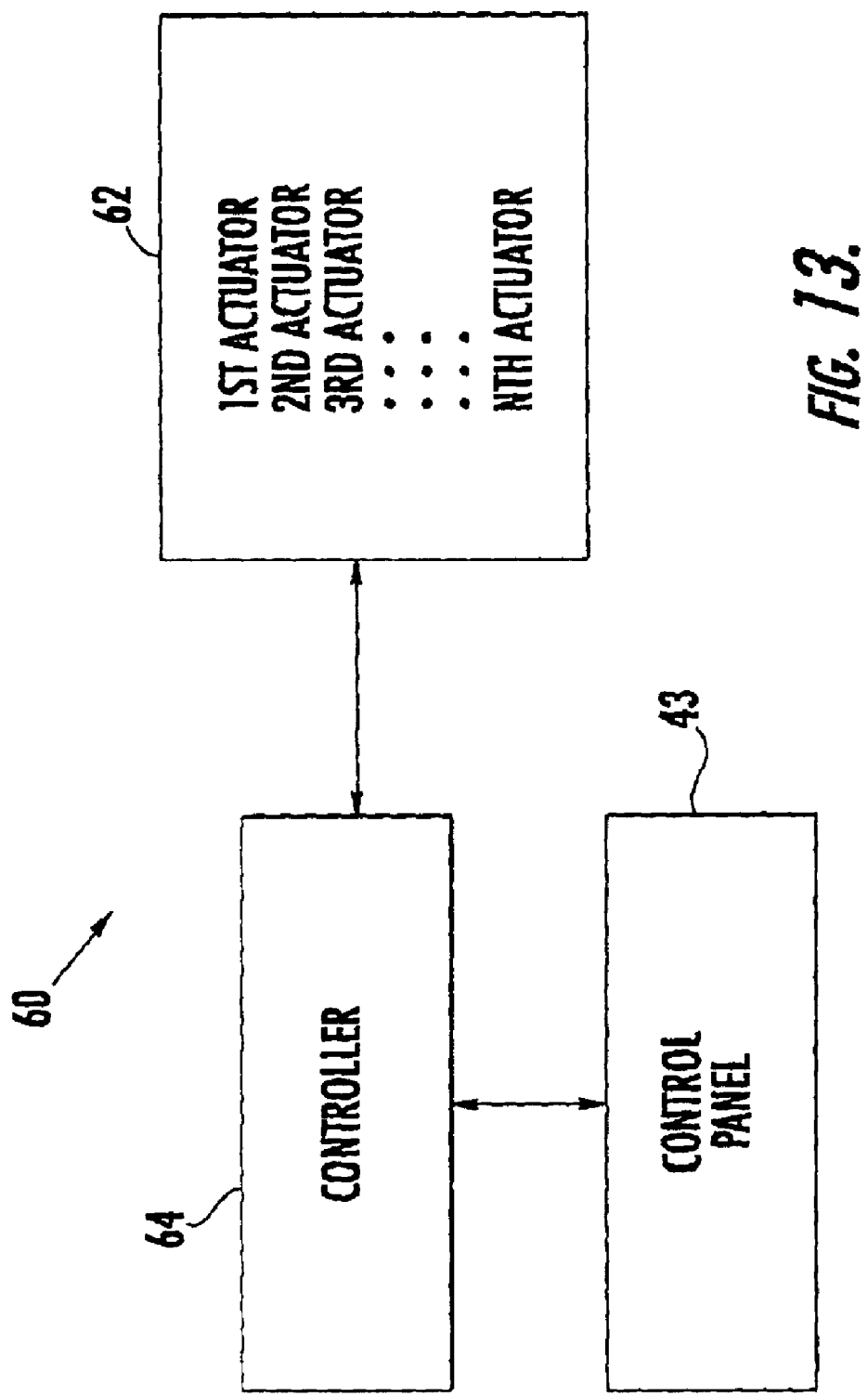
Figure 14:
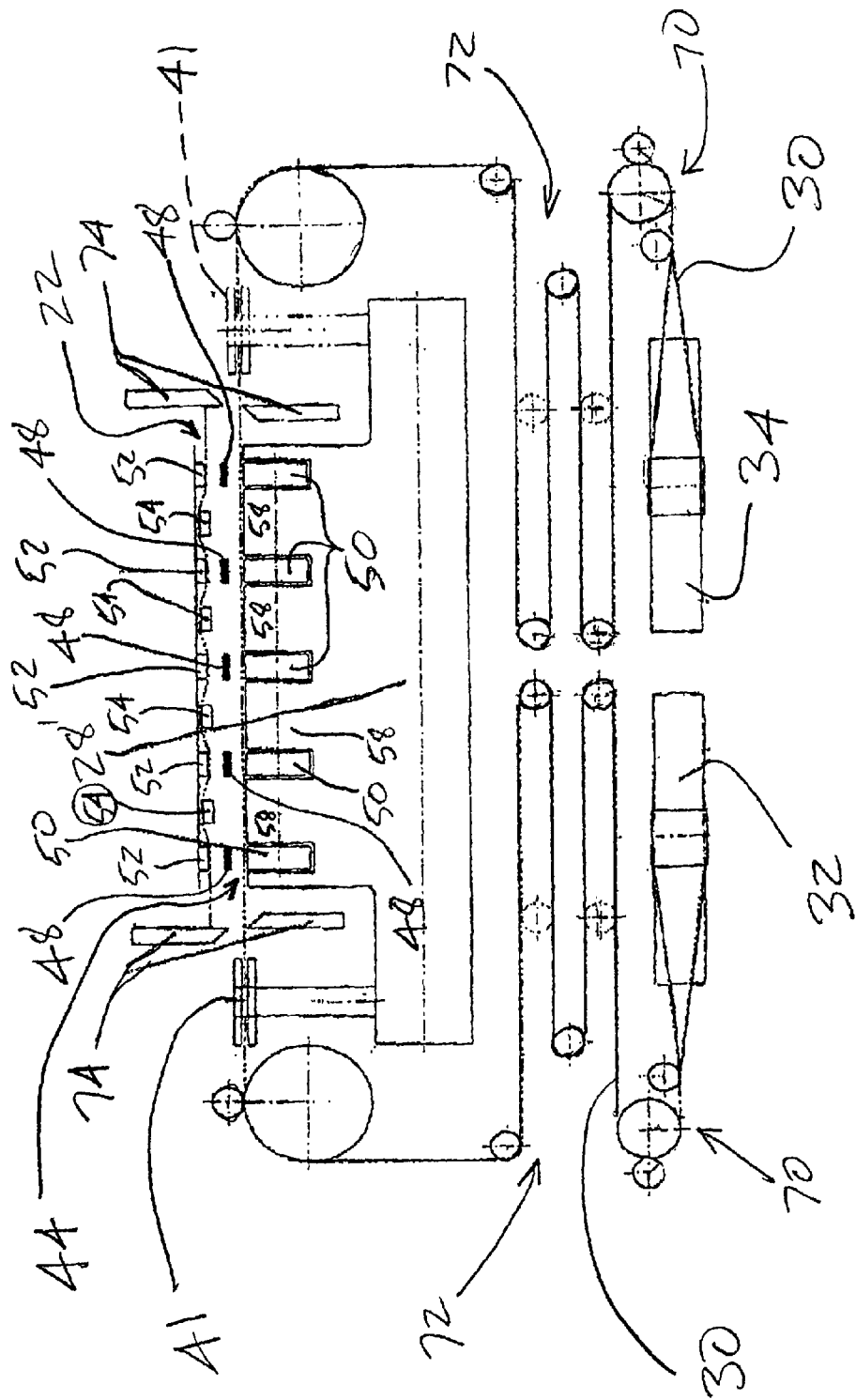

Having thus described the invention in general terms, reference will now be made to the accompanying drawings, which are not necessarily drawn to scale, and wherein:

FIG. 1 is a schematic side view of a machine for forming expandable cellular blocks and honeycomb structures, or the like, in accordance with a first embodiment of the present invention;

FIG. 2 is an isolated elevational view of a heating mechanism of the machine of FIG. 1;

FIG. 3 is a plan view schematically illustrating an expandable cellular block/honeycomb structure that can be formed by the machine of FIG. 1, and at least portions of the illustrated cellular block/honeycomb structure are representative of that which can be formed by a machine of a second embodiment of the present invention;

FIG. 4 is a schematic pictorial view of a machine for forming expandable cellular blocks and honeycomb structures, or the like, in accordance with the second embodiment of the present invention;

FIGS. 5a–12a are schematic top plan views illustrating portions of a forming mechanism and carrying mechanism of the machine of FIG. 4, and an expandable cellular block and honeycomb structure being formed, at successive stages of operation;

FIGS. 5b–12b are schematic and enlarged top plan views of portions of FIGS. 5a–12a, respectively;

FIGS. 5c–12c are schematic side sectional views illustrating portions of the forming mechanism and carrying mechanism, and the expandable cellular block and honeycomb structure being formed, respectively and substantially at the successive stages of operation of FIGS. 5a–12a;

FIG. 13 schematically illustrates a control system of the machine of FIG. 4; and FIG. 14 is a schematic plan view of portions of a machine for forming expandable cellular blocks and honeycomb structures, or the like, in accordance with a third embodiment of the present invention.

DETAILED DESCRIPTION OF THE INVENTION

The present invention now will be described more fully hereinafter, in some cases with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In accordance with one aspect of the present invention, methods and apparatus are provided for creating a low-density cellular block out of thermally bonded (i.e., welded), fibrous, thermoplastic roll and/or sheet material, and the cellular block is expandable. After being expanded and thereby transformed into a honeycomb structure, or the like, the expanded block can easily be incorporated into a constructed object. The cellular block can advantageously be manufactured without the use of chemical adhesives or glue, and without pre-folding or precorrugation of the roll material. In accordance with this and other aspects of the present invention, the cellular block can be manufactured at a high rate of production, and the welds joining the pieces that form the block are sufficently strong to inhibit inadvertent separation of the pieces while the expandable block is expanded.

In accordance with a first embodiment of the present invention, which will be described generally, followed by a description of a specific example with reference to FIGS. 1–3, the expandable cellular block is formed by:

a) positioning a cut piece being added to the cellular block parallel with each of the cut pieces of the cellular block;

b) heating, to the welding temperature of the cut pieces, first strips which are opposite one another on surfaces of the cut piece being added to the cellular block and a cut piece most recently previously added to the cellular block;

c) pressing together the surfaces of the cut piece being added to the cellular block and the cut piece most recently previously added to the cellular block, so that the first strips of the cut piece being added to the cellular block and the first strips of the cut piece most recently previously added to the cellular block respectively meet and thereby the cut piece being added to the cellular block and the cut piece most recently previously added to the cellular block are welded or thermally fused together, and the cut piece being added to the cellular block becomes the cut piece most recently previously added to the cellular block;

d) a cut piece being added to the cellular block is brought in a parallel position to the cut piece most recently previously added to the cellular block, whereby flat surfaces of the cut piece being added to the cellular block and the cut piece most recently previously added to the cellular block oppose each other;

e) heating, to the welding temperature of the cut pieces, second strips which are opposite one another on the surfaces of the cut piece being added to the cellular block and the cut piece most recently previously added to the cellular block, wherein the second strips are offset from the first strips by approximately double the width of the first and second strips;

f) pressing together the surfaces of the cut piece being added to the cellular block and the cut piece most recently previously added to the cellular block, so that the second strips of the cut piece being added to the cellular block and the second strips of the cut piece most recently previously added to the cellular block meet and thereby the cut piece being added to the cellular block and the cut piece most recently previously added to the cellular block are welded or thermally fused together, and the cut piece being added to the cellular block becomes the cut piece most recently previously added to the cellular block; and g) (a) through (f) above are continuously repeated with many further cut pieces.

Through the foregoing joining method, an expandable cellular block is created without the use of adhesives or pre-folding (e.g., precorrugating) of the roll material. This joining method is suitable for reaching high production speeds. Cutting the cut pieces from rolls of the material precedes the joining procedure. However, it is possible to produce directly from pre-cut pieces, if they are delivered as such. The product of the procedure, which is the expandable cellular block, can be delivered as is to end-users, for further work (i.e., expansion), as this provides for an optimum use of freight space. Of course, it is also possible to expand the expandable cellular block directly behind the production device, as part of the overall process. Through the invented procedure, the expandable cellular block is created via cyclical addition of cut pieces, whereby the cross section of the expandable cellular block is determined by the choice of the width of the cut pieces. The width of the cut pieces (which can correspond to the roll width of the original thermoplastic roll material) can be freely chosen by the operator, and the height of the produced expandable cellular block corresponds to the width of the cut pieces.

In accordance with the first embodiment of the present invention, the cut piece that is to be added to the expandable cellular block and the expandable cellular block, which is facing the cut piece that is to be added, are moved towards one another in the above-described steps (c) and (f). As a result, an extended compression time is available for welding strips together, which has positive effects on the weld quality.

In accordance with the first embodiment of the present invention, in steps (c) and (f) during and/or after the their initial contact, the cut piece that is being added to the cellular block and the cellular block are together moved parallel to the production direction a distance equal to the thickness of one cut piece. That is, simultaneously with the addition of the new cut piece, the produced expandable cellular block is moved in the production direction by the thickness of the new cut piece.

Preferably, the newly produced expandable cellular block is held or wedged under some pressure exerted perpendicular to the production direction. This wedging or pressure is applied across the upstream area of the expandable cellular block, where the cellular block is produced. This pressure is adjustable and thus enables the adjustment of the pressure used for and during compression and welding of each new cut piece, namely the pressure with which each new cut piece is joined with the expandable cellular block.

In order to create newly expanded honeycomb material, the expandable cellular block, which was created via the above-discussed steps (a) through (g), is heated to a temperature which enables plastic deformation, and then the block is expanded perpendicularly to its constituent cut pieces, i.e. in the production direction.

Surprisingly, it has been shown that the expandable cellular block can be expanded under heating conditions shortly after its creation, without the risk of separation or even stressing of the newly formed welds. In this case, the heat required for the plastic deformation, which is used for expansion purposes, is lower than the heat required for welding purposes. For example, in the case of roll material made of polypropylene fibers, heating between 75 to 85° C. is sufficient for expansion, whereas the welding temperature lies above 120° C., up to 165° C.

Heating of the produced cellular block may occur via infrared light. The advantage of infrared light heating is that the heat readily penetrates the section of the expandable block where a partial expansion has already taken place. The radiant heat (or another form of heating) is directed into the spaces (i.e., cells) opened up as a result of the partial expansion, in order that a fairly even heating of the entire cellular block cross section will result.

Preferably the cut pieces to be added to the expandable cellular block are transported along a circular path, cyclically, into the welding position in front of the expandable cellular block. This way, many cut pieces can be transported, one after the other, on a rotor, which thus enables high rates of production.

In accordance with the first embodiment of the present invention, a machine joins a multiplicity of cut pieces of a thermoplastic roll material to form the expandable cellular block. The machine includes a rotor and an open-ended magazine that accepts the newly formed cellular block. The rotor is positioned in front of the open-ended magazine and includes several stations that are distributed evenly about the circumference of the rotor. Each such station contains:

a) a mechanism for carrying the cut pieces, which can reach beyond the width of the cut pieces;

b) a heating mechanism, which is oriented towards the carrying mechanism, and which can be driven back and forth between a position in front of the carrying mechanism and a position that is pulled back from the carrying mechanism; and c) a pressure mechanism, which is oriented towards the carrying mechanism. Preferably, the pressure mechanism is arranged in the rotor turning direction, behind the carrying mechanism.

The rotor is located between the open-ended magazine and a transfer station, which can also be characterized as a supplying mechanism. At the stationary transfer station, the rotor takes on each newly cut piece of strip material ("cut piece") and transports it towards the magazine, which already contains the cellular block, which has been produced thus far. The welding, or heat fusion, between the newly cut piece and the previously produced cellular block occurs in front of the magazine. The stations of the rotor, which are distributed about the circumference of the rotor, have several functions. The stations take on and transport each newly cut piece to the welding position in front of the magazine. The stations heat the opposing surfaces of the cut piece most recently previously added to the cellular block and the newly cut, transported and weld-positioned cut piece that is being added to the cellular block, and effect the pressure, through which the weld between these two cut pieces occurs, by squeezing one onto the other, while they remain adequately heated.

According to the first embodiment of the present invention, the rotor is equipped with an even number of stations and the heating mechanisms are axially offset from one station to the next, with the subject axis being the axis of rotation of the rotor. This way, each of the cut pieces, which are constituents of the produced cellular block, are provided with offset welded strips, as required to provide a honeycomb structure. At the conclusion of this process, the produced expandable cellular block can then be expanded to provide the honeycomb material, with each honeycomb cell having six equidistant sides. The even number of stations on the rotor can be freely chosen as the size of the rotor will permit; e.g. six or eight stations are a practical number. The offset of the heating mechanisms of neighboring stations equals twice the width of the welding strips formed on the cut pieces in the production of honeycomb material. The pressure mechanisms can extend across the entire width of the carrying mechanism. However, it is only across the width of the welding strips that the pressure mechanisms can exert their pressure. The pressure mechanisms as well as the heating mechanisms are offset from station to station.

According to the first embodiment of the present invention, the pneumatically driven carrying mechanisms of the rotor's stations are provided with drilled holes, which can be connected to a negative pressure source. At the transfer station, each cut pieces is transferred onto the carrying mechanism by suction and thus held in place. In the welding position, in front of the magazine, once heating of each cut piece, via the heating mechanisms, has occurred, the negative pressure is disengaged, so that each cut piece is available for immediate welding. Then, the pressure mechanism presses the correctly prepared cut piece onto the cut piece most recently previously added to the cellular block, which has thus grown by the newly attached cut piece.

In accordance with the first embodiment of the present invention, the heating mechanisms consist of a number of chamber-like heating elements, which are offset from station to station by twice the width of the welding strips. The heating mechanisms on the rotor can be substituted with other heating elements of another width and an appropriately (and differently) sized distance between the chamber-like heating elements. In this way, one may adjust the honeycomb cell size.

Preferably, the pressure mechanisms are roller-shaped. The rollers of the pressure mechanisms can be equipped with an adjustable spring loading mechanism so that the pressure exerted along the welding strips, in concert with the wedging of the produced cellular block in the magazine, can be adjusted as required.

In order to convert the expandable cellular block material into expanded honeycomb material, the magazine is equipped with a heater and at least one pair of expansion rollers. The heater can consist of a single sided or a double sided set of infrared lamps. The heat is directed towards the welding strips, after the partial expansion, and towards the consequently created channels (i.e., cells). The expansion rollers can be brush rollers, or rollers that have been provided with an elastic material, such that the cellular block, which is intended to be expanded, suffers no damage during the expansion process.

An example of the first embodiment of the present invention is illustrated in FIGS. 1–3. FIG. 1 shows a table 1 for guiding the newly produced cellular block 2. At the front end of the table 1, there is an open-ended magazine 3 through which the expandable cellular block 2 extends. The open-ended magazine 3 includes a securing mechanism that subjects the expandable cellular block to an adjustable pressure that is perpendicular to the production direction. The table 1 with the open-ended magazine 3 can be moved or positioned back and forth via a mechanism in the directions indicated by the arrows 4. An infrared radiator 5 is positioned in the production direction, behind the open-ended magazine 3 and above the cellular block 2. The infrared radiator 5 heats the expandable cellular block 2 to its plastic deformation temperature. In the production direction behind the table 1 there is a pair of expansion-rollers 15, which grab the cellular block 2 from the magazine 3 and thus cause the expansion to take place, turning the expandable cellular block into honeycomb material. As illustrated in FIG. 1, the expansion-rollers 15 are equipped with brushes. The distance between the upper roller and the lower roller 15 is adjustable, in concert with the height of the cellular block 2 and the desired pressure. In the production direction, behind the expansion-rollers 15, there is a conveyor belt 16, which accepts and transports the expanded cellular block/honeycomb.

Between the open-ended magazine 3 and a supply magazine 7, from which the cut pieces are supplied, there is a rotor 6 that extends along the entire length of the cut pieces. The rotor 6 is held in bearings to permit circular motion and is connected to a cyclical drive mechanism. The rotor 6 is equipped with six stations spaced equally along its circumference, each of which transports one cut piece, provides the cut piece with welding strips and presses the cut piece onto the previously formed expandable cellular block 2, in front of the magazine 3. Every station essentially encompasses three units, specifically a radially adjustable and bar-shaped carrying mechanism 8, a tangentially adjustable heating mechanism 9, situated in front of the carrying mechanism 8, and a roller-shaped pressure mechanism 10. These three units essentially extend across the entire width (perpendicular to the plane of the drawing sheet containing FIG. 1) of the rotor 6. Motion of the carrying mechanism 8 and the comb-shaped heating mechanism 9 are guided and driven pneumatically and centrally. The pressure mechanism 10 generally consists of a spring loaded roller, which, in concert with the turning motion of the rotor 6, presses the cut piece, which has been provided with welding strips, from the top, downwards towards the expandable cellular block 2, and thereby completes the welding process through which the newly cut and positioned piece is attached to the expandable cellular block 2.

Regarding operation of a representative station of the rotor 6 more specifically, in front of the supply magazine 7, the carrying mechanism 8 is activated, while the heating mechanism 9 is pulled back, whereby a cut piece is taken on by the carrying mechanism 8, from the supply magazine 7. More specifically, the carrying mechanism 8 is provided with drilled holes or ports $8^a$ that are opened to a negative pressure source so that a vacuum causes the cut piece to be retrieved and carried by the carrying mechanism.

During the turning motion of the rotor 6, in the direction of the arrow 11, the heating mechanism 9 is driven forward so that the cut piece being carried by the carrying mechanism 8 is positioned between the carrying mechanism 8 and the comb-shaped heating mechanism 9. During this process, the carrying mechanism 8 remains in a position that is radially inward and away from the heating mechanism 9. As soon as this station has completed three "cycles" and has assumed a position in front of the open-ended magazine 3, the carrying mechanism 8 carrying the cut piece and the open-ended magazine 3 carrying the expandable cellular block 2 are moved so that the cut piece carried by the carrying mechanism 8 and the expandable cellular block 2 can both be contacted by the comb-shaped heating mechanism 9. Now the comb-shaped heating mechanism 9 is pulled back between the cut piece on the carrying mechanism 8 and the expandable cellular block 2, so that welding strips are formed through contact between the heating mechanism 9 and the opposing surfaces of the cut piece carried by the carrying mechanism 8 and the expandable cellular block 2. Finally, the carrying mechanism 8 with the cut piece and the open-ended magazine 3 with the expandable cellular block 2 are moved more closely toward one another, until the welding strips just formed on the cut piece and the expandable cellular block 2 come in contact with one another. Following this last step, the carrying mechanism 8 and the open-ended magazine 3 once again move apart, and the rotor 6 cycles forward. During this process, the roller of the pressure mechanism 10 of this station rolls over the cut piece that was just added to the expandable cellular block 2, so that pressure is applied and the expandable cellular block 2 is pushed forward a distance equivalent to the thickness of the cut piece. These operations are repeated each time a station of the rotor 6 is moved into position in front of the expandable cellular block 2.

FIG. 2 is a frontal view of a representative heating mechanism 9 whose chamber-like heating elements 12 are heated electrically to the required temperature in order to effect the welding bonds between the cut pieces of the thermoplastic material to form the expandable cellular block 2.

FIG. 3 illustrates the cellular block 2 during a three part transition from the non-expanded cellular block material in area a, through the partially expanded status in area b, to a substantially expanded status in area c. The heating via the infrared radiator 5 occurs at least partially in area b, so that the radiant heat can reach the inside of the cellular block 2.

FIG. 4 illustrates a machine 20, and FIGS. 5–12 illustrate successive operations of the machine 20 and a honeycomb structure/expandable cellular block at different stages of being formed, in accordance with a second embodiment of the present invention. The honeycomb structure/expandable cellular block formed by the machine 20 can be generally characterized as a cellular block 24 (FIGS. 5–12, and also see FIG. 3, because it illustrates a cellular block whose downstream portions are at least substantially similar to the cellular block 24). Referring to FIG. 4, the machine 20 has a supplying mechanism 26 that includes a carrying mechanism 28 in the form of a laterally extending, rotating mandrel or drum, which is more generally a rotor. That is, the carrying mechanism 28 of the second embodiment of the present invention is in the form of a rotor. However, in accordance with a third embodiment of the present invention, the carrying mechanism preferably does not rotate, and is therefore not characterized as a rotor, as is discussed in greater detail below. The supplying mechanism 26 also includes supplying submechanisms for feeding strips 30 from first and second rolls 32 and 34 respectively to stations of the carrying mechanism 28, as will be discussed in greater detail below. The rolls 32 and 34 may contain the same or different types of material, to provide a cellular block that includes or is constructed of different types of material.

Referring to FIGS. 4–12, the carrying mechanism 28 supplies pieces cut from the strips 30, including cut pieces 36a–e (see FIGS. 5–12, with an emphasis on FIGS. 5b–12b, for example), to a forming mechanism 22 (FIG. 4) of the machine 20. The strips 30 can be many different materials, but are most preferably strips of thermoplastic polymeric material that is in the form of a film, sheet or nonwoven fabric. Preferably the strips 30 have a narrow width, such as in the range of four to five inches; however, other and larger widths can also be used.

The cellular block 24 is formed in the forming mechanism 22 from the cut pieces, including cut pieces 36a–e, that are sequentially supplied from the carrying mechanism 28. The cellular block 24 progresses downstream from the forming mechanism 22 into an expansion mechanism 38 (FIG. 4) of the machine 20. In the expansion mechanism 38, the cellular block 24 is expanded (e.g., pulled in the downstream direction) during the application of heat to form a completed honeycomb structure, or the like. In accordance with one example, the expansion mechanism 38 includes heating and pulling components like those of the first embodiment, described above, that operate to expand the expandable cellular block to form a completed honeycomb structure, like that shown in area c of FIG. 3.

Referring in greater detail to supplying operations carried out by the supplying mechanism 26 of the machine 20, they will be described with respect to representative pieces 36d (see FIGS. 4, 7a and 7c, for example) and 36e (FIGS. 12a and 12b) that originate from the first and second rolls 32 and 34, respectively. The piece 36d is supplied from the first roll 32 to a first station 40 (see FIGS. 4, 5a, 7a, 10c and 11c, for example) of the carrying mechanism 28 by a carriage system 41 (FIG. 4) of the supplying mechanism 26. The carriage system 41 is positioned in front of and travels laterally along (i.e., between the opposite ends of) the carrying mechanism 28. As best understood with reference to FIGS. 4 and 7a, the carriage system 41 grips the free end of the strip 30 originating from the first roll 32, and draws the strip, for example the piece 36d of the strip, across the first station 40. A partial vacuum supplied at the first station 40 via vacuum ports 42 (see FIG. 11c, for example) formed in the carrying mechanism 28 holds the cut piece 36d to the first station. The vacuum (i.e., the flow toward a vacuum pump or other source of negative pressure) is illustrated by small arrows that extend toward the rotational axis of the carrying mechanism 28 in FIGS. 5c–12c, and by small arrows that extend toward and then along the rotational axis of the carrying mechanism in FIGS. 5a–12a. A cutter mounted proximate the end of the carrying mechanism 28 closest to a control panel 43 (FIG. 4) cuts the piece 36d from the strip 30 of the first roll 32 once the carriage system 41 has drawn the piece 36d across substantially the entire length of the first station 40.

Thereafter, the carrying mechanism 28 is rotated 180° about its elongate axis (see FIG. 10c) so that the first station 40, and the cut piece 36d it is carrying, both face the forming mechanism 22 and the cellular block 24 being formed within the forming mechanism. The cut piece 36d is then operated upon by the forming mechanism 22 so that it is incorporated into the cellular block 24, as will be discussed in greater detail below.

Similarly, and while the cut piece 36d is being operated upon by the forming mechanism 22, the piece 36e (FIGS. 12a and 12b) originating from the second roll 34 is supplied to a second station 44 (see FIGS. 10c and 12a, for example) of the carrying mechanism 28 by the carriage system 41 (FIG. 4) that travels in front of and along the carrying mechanism 28. The carriage system 41 grips the free end of the strip 30 originating from the second roll 34, and draws the strip, for example the piece 36e of the strip, across the second station 44. A partial vacuum supplied at the second station 44 via vacuum ports 46 (see FIG. 10c, for example) formed in the carrying mechanism 28 holds the cut piece 36e to the second station. A cutter mounted proximate the end of the carrying mechanism 28 farthest from the control panel 43 (FIG. 4) cuts the piece 36e from the strip 30 of the second roll 34 once the carriage system 41 has drawn the piece 36e across substantially the entire length of the second station 44.

Advantageously, the cut pieces, such as the cut pieces 36a–e, which are supplied to the carrying mechanism 28 and respectively held by the first and second stations 40 and 44 of the carrying mechanism, are at least originally substantially planar while being held by the carrying mechanism. This avoids problems associated with handling precorrugated strips, since precorrugated strips are preferably not used by the machine 20.

In addition to rotating about its axis, the carrying mechanism 28 reciprocates in the upstream/downstream direction (with the upstream/downstream direction being defined by the "flow" of the cellular block 24 being formed) as part of the process of supplying the cut pieces to the forming mechanism 22. The reciprocation of the carrying mechanism 28 is at least partially illustrated by directional arrows closely associated with the carrying mechanism in some of the figures. The carrying mechanism 28 rotates while it is not reciprocating, it reciprocates while it is not rotating (i.e., it translates), and the opposite stations 40 and 44 of the carrying mechanism extend generally upright, and most specifically and preferably vertically, while the carrying mechanism 28 is not rotating. However, both motions could also be achieved contemporaneously. Although the illustrated version of the second embodiment includes only two stations 40 and 44, additional stations can be incorporated into the carrying mechanism 28.

As illustrated in FIGS. 12a–c, the cut piece 36d is welded to the cellular block 24 while the piece 36e is being supplied to the second station 44 of the carrying mechanism 28, with both of these operations occurring while the carrying mechanism 28 is in its most downstream position. This supplying process continues repeatedly, so that cut pieces, including cut pieces 36a–d, are supplied to the forming mechanism 22 in sequence. Each cut piece 36a–d preferably extends substantially upright, and most preferably vertically, while it is ultimately supplied to the forming mechanism 22, within the forming mechanism, and within the expansion mechanism 38. Whereas this vertical orientation is preferred since it allows the cellular block 24 to be formed and "flow" horizontally such that the floor supporting the machine 20 does not impede formation of a cellular block of infinite length, the entire machine 20 could be rearranged. For example, the machine could be oriented so that the cut pieces 36a–d extend substantially horizontally while they are ultimately supplied to the forming mechanism 22, within the forming mechanism, and within the expansion mechanism 38.

The forming mechanism 22 of the machine 20 includes a laterally extending set of welding rollers 50 (FIGS. 5–12) and a laterally extending set of rod-like heating elements 48 (FIGS. 5–12) that are all mounted at a position below the cellular block 24. The set of welding rollers 50 can be collectively and generally referred to as a welding mechanism or rolling mechanism. Although multiple of the welding rollers 50 and heating elements 48 are shown in FIGS. 5a–12a and 5b–12b, in many cases only a representative few are identified by their reference numeral in an effort to clarify the drawings. However, the set of welding rollers 50 extends parallel to the axis of rotation of the carrying mechanism 28, and the welding rollers remain aligned with one another and parallel to one another; therefore, they can be easily identified in the drawings, even without being identified by their reference numeral. Likewise, the set of heating elements 48 extends parallel to the axis of rotation of the carrying mechanism 28, and the heating elements remain aligned with one another and parallel to one another; therefore, they can be easily identified in the drawings, even without being identified by their reference numeral.

The set of welding rollers 50 and the set of heating elements 48 are respectively aligned with one another. The heating elements 48 and welding rollers 50 are mounted for reciprocating both up/down and in the upstream/downstream direction, as at least partially illustrated by the directional arrows closely associated therewith in some of the figures. Also, the welding rollers 50 are each mounted for pivoting, as evident from comparing some of the figures (see FIGS. 7c and 12c, for example), and as at least partially illustrated by the directional arrows closely associated therewith in FIG. 8b. Alternatively, this pivoting is not required, and the welding rollers 50 translate into engagement with the respective cut piece. In addition, each of the welding rollers 50 is mounted for rotating about an axis that is parallel to the axis of rotation of the carrying mechanism 28, as indicated by arrows closely associated with the welding rollers 50 in FIGS. 7c and 12c.

Referring in greater detail to forming operations of the forming mechanism 22 of the machine 20, they will be described with respect to representative cut pieces 36a–d that are serially provided from the carrying mechanism 28 to the forming mechanism in the manner described above, with the cut pieces 36a–d being supplied in alphabetical order. Referring to FIG. 5, while the cut piece 36d is being positioned adjacent the cellular block 24, which already includes cut pieces 36a and 36b, the heating elements 48 and welding rollers 50 all contemporaneously move upward, so that the welding rollers are on the upstream side of (and in opposing face-to-face relation with) the cut piece 36d and the heating elements are on the downstream side of (and in opposing face-to-face relation with) the cut piece 36d. More specifically, the cut piece 36d is positioned adjacent the cellular block 24 by the carrying mechanism 28 in the manner described above, and then the heating elements 48 and welding rollers 50 contemporaneously move upward on the opposite sides of the cut piece 36d while the cut piece 36d is still being held by the carrying mechanism 28. As best understood with reference to FIG. 6c, the piece 36d, carrying mechanism 28, heating elements 48 and welding rollers 50 then generally together move toward the cellular block 24, so that the heating elements are sandwiched between the cut piece 36c being added to the cellular block and the cut piece 36b most recently previously added to the cellular block.

Then the welding rollers 50 and heating elements 48 are contemporaneously moved downward, with the upper tips of the heating elements slightly leading the welding rollers along the downward path of travel. Additionally, the welding rollers 50 are moved further downstream, such as by pivoting, as best understood with reference to FIG. 7c, to engage and force laterally spaced apart heated strips of the cut piece 36c against laterally spaced apart and heated strips of the cellular block 24, namely laterally spaced apart and heated strips of the cut piece 36b most recently previously added to the cellular block. The heated strips of the cut pieces 36c and 36b are heated by the heating elements 48 that are sandwiched between and being withdrawn from between these cut pieces.

The heated strips of the cut pieces 36c and 36b are respectively pinched together (i.e., nipped) between the welding rollers 50 and a laterally extending set of rod-like, first welding anvils 52 (see FIGS. 5a–12a and 5b–12b, for example). The welding rollers 50 and heating elements 48 are moved downward while the welding rollers continue to nip the cut pieces 36c and 36b together, so that the cut piece 36c is added to the cellular block 24. Although multiple of the first welding anvils 52 are shown in FIGS. 5a–12a and 5b–12b, in many cases only a representative few are identified by their reference numeral in an effort to clarify the drawings. However, the set of first welding anvils 52 extends parallel to the axis of rotation of the carrying mechanism 28, and the first welding anvils remain aligned with one another and parallel to one another; therefore, they can be easily identified in the drawings, even without being identified by their reference numeral.

Figure 9A:
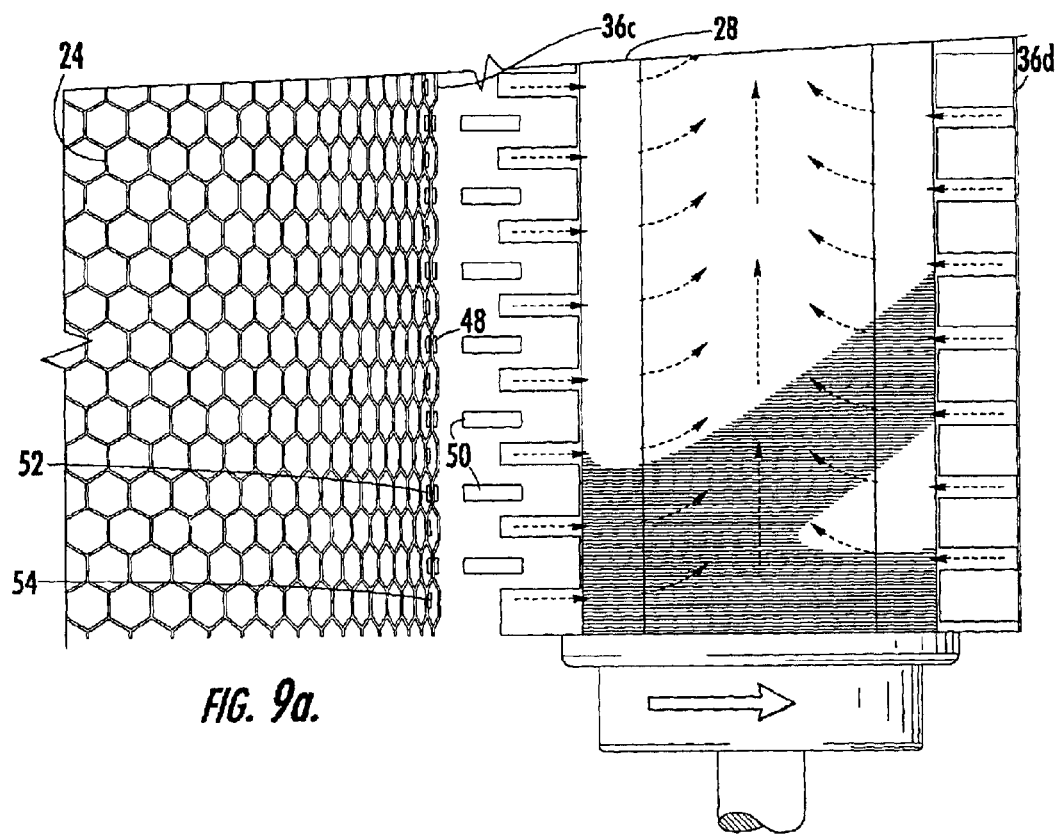
Figure 9C:
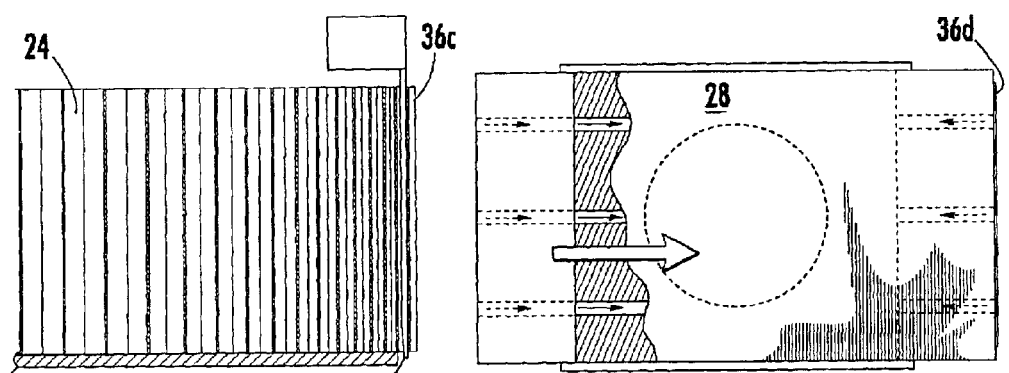
Figure 9B:
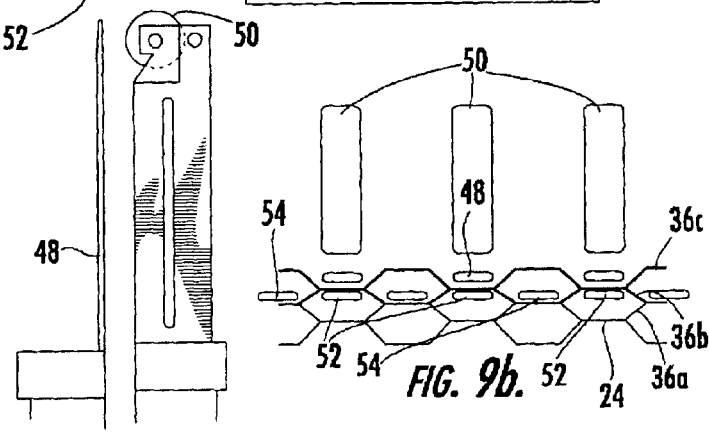

The set of first welding anvils 52 can be collectively and generally referred to as a welding mechanism. In this regard, the cut piece 36c is added to the cellular block 24 via thermal fusing (e.g., welding) that occurs at upright and elongate points of engagement between the cut pieces 36c and 36b as a result of the elevated temperature of the heating elements 48 and the forces applied by the welding rollers 50 as they roll downward across the upstream surface of the cut piece 36c and cooperate with the first welding anvils 52 to nip the cut pieces 36b and 36c. Referring to FIG. 8, the welding rollers 50 and heating elements 48 continue to move downward so that they become completely removed from the cellular block 24, at which time the welding rollers move upstream, preferably by pivoting. Thereafter, the carrying mechanism 28 moves upstream, as shown in FIGS. 9a and 9b, so that it can be rotated without hitting the cellular block 24 or components of the machine 20, as shown in FIGS. 10a and 10c.

As best understood with reference to FIG. 10, thereafter and while the carrying mechanism 28 rotates 180°, the first set of welding anvils 52 reciprocates both upwardly/downwardly and in the upstream/downstream direction to become positioned proximate the upstream side of the cellular block 24. Also, the heating elements 48 and welding rollers 50 translate in the lateral direction each time, and while, the carrying mechanism rotates 180°. As soon as the first set of welding anvils 52, heating elements 48 and welding rollers 50 have repositioned and the carrying mechanism 28 has rotated 180°, which are completed at about the same time, the carrying mechanism moves downstream to supply the cut piece 36d to the forming mechanism 22 in the manner described above, and as best understood with reference to FIGS. 11–12. Then, the welding rollers 50 and the heating elements 48 contemporaneously move upward on opposite sides of the cut piece 36d in the manner that was described above with reference to the cut piece 36c. Thereafter, the welding rollers 50, heating elements 48 and carrying mechanism 28 function with respect to the cut piece 36d similarly to the manner in which they functioned with respect to the cut piece 36c, except for being laterally offset, and except that the welding rollers 50 cooperate with a laterally extending set of rod-like second welding anvils 54 (see FIGS. 5a–12a and 5b–12b, for example). As a result, the cut piece 36d is thermally fused (i.e., welded) to and becomes part of the cellular block 24, as is illustrated in FIG. 12.

The welding rollers 50 cooperate with the set of second welding anvils 54 generally in the same manner that they operate with respect to the first set of welding anvils 52, to form the welds by nipping. Accordingly, the set of second welding anvils 54 can be collectively and generally referred to as a welding mechanism. Although multiple of the second welding anvils 54 are shown in FIGS. 5a–12a and 5b–12b, in many cases only a representative few are identified by their reference numeral in an effort to clarify the drawings. However, the set of second welding anvils 54 extends parallel to the axis of rotation of the carrying mechanism 28, and the second welding anvils remain aligned with one another and parallel to one another; therefore, they can be easily identified in the drawings, even without being identified by their reference numeral.

Thereafter, the carrying mechanism 28 rotates 180°, and the second set of welding anvils 54 reciprocates both upwardly/downwardly and in the upstream/downstream direction to become positioned proximate the upstream side of the cellular block 24. Also, the heating elements 48 and welding rollers 50 translate in the lateral direction while the carrying mechanism rotates 180°. As soon as the second set of welding anvils 54, heating elements 48 and welding rollers 50 have repositioned and the carrying mechanism 28 has rotated 180°, which are completed at about the same time, the carrying mechanism moves downstream to supply the cut piece 36e (FIGS. 12a and 12c) to the forming mechanism 22 in the manner described above. Then, the forming mechanism 22 operates with respect to the cut piece 36e in generally the same manner that it previously operated with respect to the cut piece 36c, to weld the cut piece 36e to the cut piece 36d. More specifically, the welding rollers 50 respectively cooperate with the heated first welding anvils 52 so that the cut piece 36e is fused to and becomes part of the cellular block 24.

As best understood with reference to FIGS. 5b–12b, the two sets of welding anvils 52 and 54 are arranged in a laterally alternating fashion, and the two sets are aligned, except when one of them is repositioning. As mentioned above, the heating elements 48 and welding rollers 50 translate laterally each time the carrying mechanism 28 rotates. As a result, the welding rollers 50 and heating elements 48 shift so as to be associated with a different one of the sets of welding anvils 52 and 54 with each 180° rotation of the carrying mechanism 28. That is, the welding rollers 50 and heating elements 48 reciprocate and the above-described concerted operations of the machine 20 continue repeatedly so that the cellular block 24 continues to be serially formed.

Generally describing the operations of the forming mechanism 22 of the machine 20, each new cut piece (for example see cut pieces 36a–e) is joined to the cut piece immediately previously joined to the cellular block 26 by contemporaneously forming multiple spaced apart welds between the new and prior cut pieces. The welds are formed by contemporaneously heating opposed strips of the new and prior cut pieces with the heating elements 48, and respectively nipping those heated strips of the new and prior cut pieces between opposed welding mechanisms, namely the welding rollers 50 and the respective set of welding anvils 52 or 54. The heating elements 48 provide the heat that is utilized to form the welds, and the welding rollers 50 move to provide rolling contact regions that cause the nipping, which provides the pressure that is utilized in combination with the heat to form the welds. More specifically, the welding rollers 50 roll in close proximity to and relative to the respective welding anvils 52 and 54, while the respective welding anvils 52 or 54 remain substantially stationary, to cause the nipping, and the nips closely lag behind and follow the upper tips of the heating elements 48 as they are moved downward between the respective cut pieces being welded together. Stated differently, heat is supplied from heating elements 48 that are positioned between the respective cut pieces being welded together, and immediately thereafter the resulting heated strips are nipped between the welding rollers 50 and respective welding anvils 52 or 54, which supplies the pressure that, with the heat, forms the welds. This advantageously minimizes the risk that cut pieces other than those being currently nipped will be welded. This process is repeated sequentially for each new cut piece that is added to the cellular block 24, so that the nipping by the welding rollers 50 alternates between the welding anvils 52 and 54.

Figure 7A:
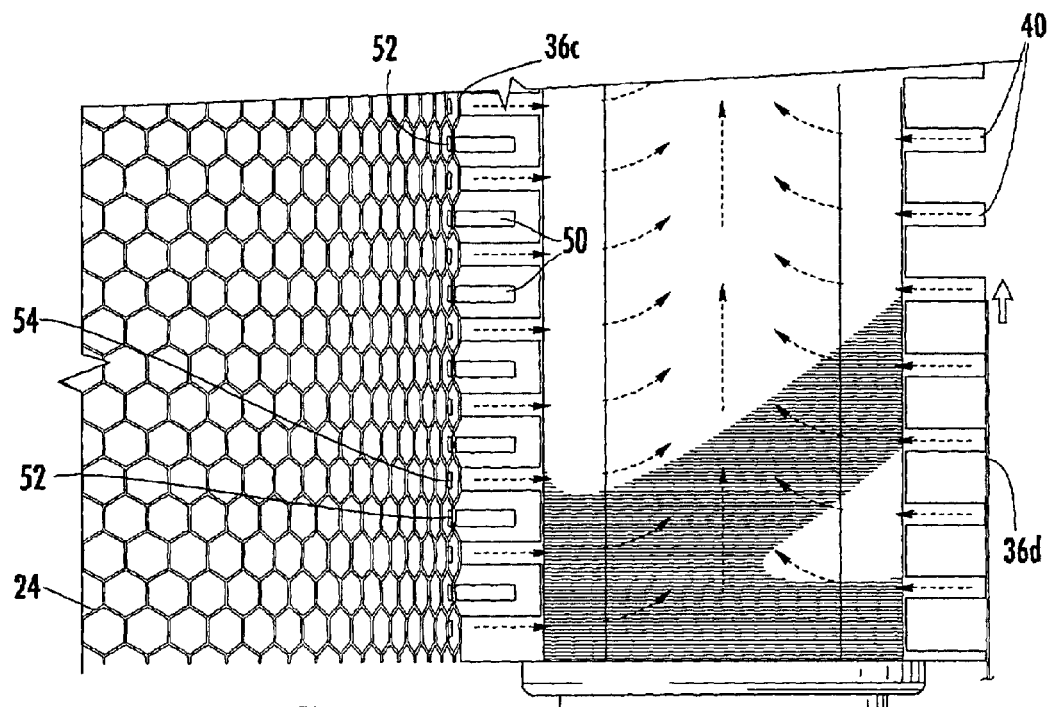
Figure 7C:
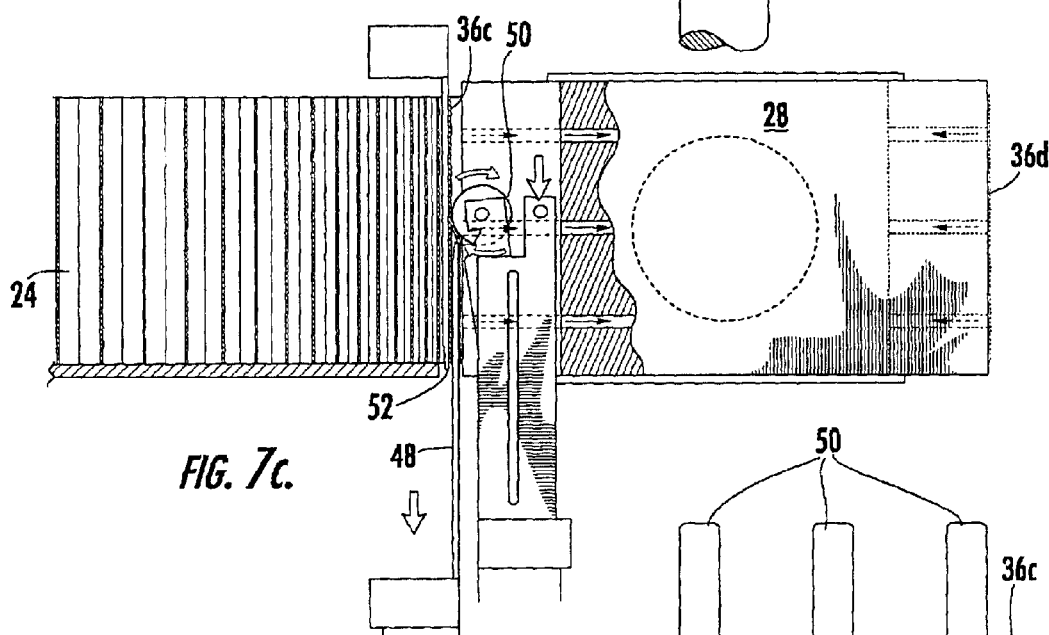
Figure 7B:
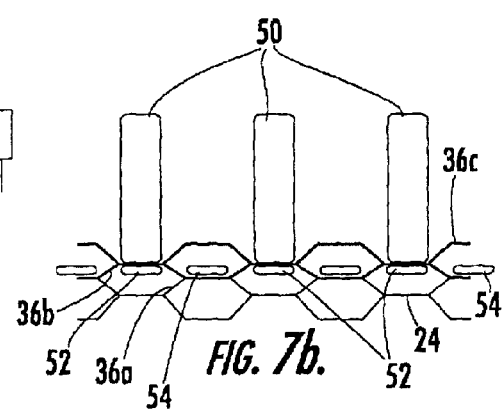

More specifically and for example, the nipping alternately includes nipping cut pieces between the welding rollers 50 and the first welding anvils 52, then translating the welding rollers laterally and nipping cut pieces between the welding rollers and the second welding anvils 54, then translating the welding rollers laterally and nipping cut pieces between the welding rollers and the first welding anvils 52, and so on. The heating elements 48 are moved in a concerted manner to apply the heat that is necessary for the welding, with the heat being applied immediately prior to the nipping and substantially solely between the cut pieces being welded and to the strips that are in the process of being nipped. Referring to FIG. 7b for example, welding the cut piece 36c to the cellular block 24 includes contemporaneously forming multiple laterally spaced apart and elongate first welds between the cut piece 36c and the cut piece 36b that was most recently previously welded to the cellular block. Thereafter, and referring to FIG. 12b for example, welding the cut piece 36d to the cellular block 24 includes forming multiple spaced apart and elongate second welds between the cut piece 36c and the cut piece 36d, so that the second welds are laterally offset from the first welds. This adding of additional cut pieces by forming offset welds continues repeatedly.

Referring to FIGS. 6a and 11a, for example, each of the stations 40 and 44 of the carrying mechanism 28 respectively includes or is defined by a set of protrusions 56 and 58, and slots are defined between adjacent ones of the protrusions. The welding rollers 50 are respectively received by the slots of the station of the carrying mechanism 28 that is oriented toward the cellular block 24, while the welding rollers and heating elements 48 move upward along opposite sides of a new cut piece that is about to be welded to the cellular block. The series of slots/protrusions that define one station of the carrying mechanism 28 are laterally offset from the series of slots/protrusions that define the opposite station of the carrying mechanism, to accommodate for the lateral reciprocation of the welding rollers 50, which is described above. More specifically, the carrying mechanism 28 can be a rectangular shaft with slots formed into opposite sides thereof, and each slot can be described as a gap defined between protrusions of the shaft, with the protrusions and gaps extending perpendicular to and radially from the rotational axis of the shaft. The vacuum-supplying ports 42 and 46 are respectively open at the outwardly oriented faces of the protrusions 56 and 58.

Referring back to FIG. 4 and the supplying mechanism 26, for each of the rolls 32 and 34, a cutter 59 can be positioned for cutting the strips 30 as they are drawn from the roll, so that two layers of cellular block are contemporaneously manufactured by the machine 20. Additionally, each of the cutters 59 can perform scallop-like cuts (e.g., sinusoidally shaped cuts) in the respective strip 30, so that the broad surface of a resulting cellular block has a varied topography, which enhances the resilient/cushioning functionality of the cellular block in a direction normal to the broadest surfaces of the cellular block.

Although the FIGS. 5a–12a and 5c–11c illustrate that the vacuum is supplied to the vacuum ports 42 and 46 continuously, in another embodiment of the present invention the vacuum is supplied to a station of the carrying mechanism 28 only so long as that station is intended to hold a cut piece of material from which the cellular block 24 is formed.

Referring to FIG. 13, the above-described operations of the machine 20 are facilitated by a control system 60 that includes a controller 64, such as a computer, that is programmed to control the above-described operations. The control system 60 also includes an actuator system 62 that includes multiple actuators whose actuations are controlled by the controller 64. The actuators are respectively connected to, and facilitate the movements of, the moving parts of the machine 20. The actuators can acceptably be motors, pneumatic actuators or/and other types of actuators suitable for facilitating the above-described movements of the components of the machine 20. The control panel 43 (also see FIG. 4) is part of, or connected to, the controller 64 to allow an operator of the machine 20 to specify and adjust operating parameters of the machine 20. Similarly, the machine of the first embodiment, which is illustrated in FIG. 1, includes a control system that is generally like the control system 60, except that it is tailored to the machine of the first embodiment. Although the heating elements 48 and welding rollers 50 are illustrated as being mounted to separate beams in the drawings, they may alternatively or ultimately be mounted to the same beam.

A machine for forming expandable cellular blocks and honeycomb structures, or the like, in accordance with the third embodiment of the present invention is substantially similar to the machine of the second embodiment of the present invention, except for variations noted and variations that will be apparent to those of ordinary skill in the art in view of this disclosure. Referring to FIG. 14, the strips 30 are drawn from first and second rolls 32 and 34, which rotate about horizontal axes, and the strips are rotated 90°, due to the action and arrangement of feed roller systems 70. The strips 30 are respectively supplied from the feed roller systems 70 to accumulator systems 72. The carriage system 41 is mounted for traveling laterally along and behind the carrying mechanism 28', between the carrying mechanism and the forming mechanism 22. The carriage system 41 respectively supplies the strips 30, which are respectively cut by cutters 74, from the accumulator systems 72 to the sole station 44 of the carrying mechanism 28'.

That is, and in accordance with the third embodiment of the present invention, rather than the carrying mechanism 28'rotating 180° as in the second embodiment, the carrying mechanism translates/reciprocates laterally with the heating elements 48 and welding rollers 50, to achieve substantially the same result as that achieved by the machine of the second embodiment of the present invention, while eliminating the rotating and the first station 40 (see FIGS. 4, 5a, 7a, 10c and 11c, for example) and its associated vacuum ports. Otherwise, according to the third embodiment the motions of the carrying mechanism 28' and the forming mechanism 22, and their interaction, are substantially as described above for the second embodiment of the present invention. Accordingly, FIGS. 5–12 can be made illustrative of the operations of the machine of the third embodiment (i.e., they are illustrative of the operations of the machine of the third embodiment) by removing the station 40; never rotating the carrying mechanism 28/rather than rotating the carrying mechanism 28 as illustrated in FIGS. 10a–10b, moving the carrying mechanism 28 laterally with the heating elements 48 and welding rollers 50 and always having the station 44 oriented toward the forming mechanism 22; and respectively applying the cut pieces of the strips 30 to the station 44, via the carriage system 41, each time the carrying mechanism 28 is at its farthest position from the forming mechanism 22.

In accordance with the third embodiment of the present invention, multiple rotating brush-like rollers (for example see the brush-like rollers 15 illustrated in FIG. 1) are positioned immediately downstream of the forming mechanism 22 to engaging the formed cellular block and thereby assist in moving the formed cellular block toward the downstream expansion mechanism (for example see the expansion mechanism 38 of FIG. 4).

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for joining multiple cut pieces of thermoplastic material to form a cellular block, comprising:

supplying at least one cut piece to be added to the cellular block by engaging a plurality of spaced apart protrusions to the cut piece to be added to the cellular block and moving the protrusions along a path so that the protrusions carry the cut piece to be added to the cellular block along the path to a position proximate the cellular block; and then welding the cut piece to be added to the cellular block to a cut piece most recently previously welded to the cellular block, including moving a plurality of welding mechanisms respectively within respective slots defined between adjacent protrusions of the plurality of protrusions, and engaging the welding mechanisms against the cut piece to be added to the cellular block.

2. A method according to claim 1, wherein the moving the protrusions along the path includes translating the protrusions.

* * * * *